United States Patent
Hayashi et al.

(10) Patent No.: US 6,596,071 B2
(45) Date of Patent: Jul. 22, 2003

(54) ORGANIC AND INORGANIC COMPOSITE PIGMENTS, AND PAINT AND RESIN COMPOSITION USING THE SAME

(75) Inventors: Kazuyuki Hayashi, Hiroshima (JP); Keisuke Iwasaki, Hiroshima (JP); Mineko Ohsugi, Hiroshima (JP); Yusuke Shimohata, Hiroshima (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/166,034

(22) Filed: Jun. 11, 2002

(65) Prior Publication Data
US 2003/0101908 A1 Jun. 5, 2003

(30) Foreign Application Priority Data
Jun. 12, 2001 (JP) ........................................ 2001-177828

(51) Int. Cl.$^7$ .............................. C09C 3/12; C09C 1/00
(52) U.S. Cl. .................... 106/445; 106/413; 106/416; 106/417; 106/426; 106/429; 106/465; 106/471; 106/487; 106/490; 106/493; 106/494; 106/495; 106/496; 106/497; 106/498; 106/499; 524/261
(58) Field of Search ................ 106/413, 416, 106/417, 426, 429, 445, 465, 471, 487, 490, 493, 494, 495, 496, 497, 498, 499; 524/261

(56) References Cited

U.S. PATENT DOCUMENTS

| | | | | | |
|---|---|---|---|---|---|
| 4,544,415 A | * | 10/1985 | Franz et al. | ................. | 106/417 |
| 5,607,994 A | * | 3/1997 | Tooley et al. | ................ | 524/265 |
| 5,707,437 A | * | 1/1998 | Niedenzu et al. | ........... | 106/446 |
| 5,889,090 A | * | 3/1999 | Tooley et al. | ................ | 523/212 |

FOREIGN PATENT DOCUMENTS

| | | | |
|---|---|---|---|
| EP | 1 217 044 | * | 6/2002 |
| JP | 56-99262 | * | 8/1981 |
| JP | 8-127732 | * | 5/1996 |

* cited by examiner

*Primary Examiner*—Anthony J. Green
(74) *Attorney, Agent, or Firm*—Nixon & Vanderhye P.C.

(57) ABSTRACT

Organic and inorganic composite pigments having an average particle diameter of 0.01 to 10.0 μm composed of a white inorganic particle, an organosilane compound obtained from alkoxysilanes, or polysiloxanes coating on the white inorganic particle, and an organic pigment coat formed on said coating. An ultraviolet light-absorbing agent is present in any portion from the surface of the white inorganic particle to surface of the organic pigment coat. These composite pigments have reduced amounts of organic pigments desorbed from their surface and exhibit excellent light resistance due to their ultraviolet absorbing property.

11 Claims, No Drawings

ORGANIC AND INORGANIC COMPOSITE PIGMENTS, AND PAINT AND RESIN COMPOSITION USING THE SAME

BACKGROUND OF THE INVENTION

The present invention relates to organic and inorganic composite pigments, a paint using the organic and inorganic composite pigments, and a resin composition using the organic and inorganic composite pigments. More particularly, the present invention relates to organic and inorganic composite pigments not only being lessened in amount of organic pigments desorbed from the surface of the white inorganic particles, but also exhibiting an excellent light resistance owing to good ultraviolet absorbing property thereof, a paint using such organic and inorganic composite pigments, and a resin composition using such organic and inorganic composite pigments.

As well known in the art, inorganic pigments and organic pigments have been used as color pigments for resins, paints, printing inks or the like according to the applications.

In general, it is known that the inorganic pigments have an excellent light resistance, but are have a low tinting strength and fail to show a clear hue. There have been known some inorganic pigments capable of exhibiting a clear hue. However, many of these inorganic pigments having a clear hue contain as constituents thereof, harmful metals such as lead, mercury, cadmium, chromium or the like. Therefore, it has been strongly required to provide alternate harmless pigments exhibiting a more clear hue instead of such inorganic pigments from the standpoints of hygiene, safety and environmental protection.

On the other hand, it is known that the organic pigments exhibit a clear hue, but have low hiding power and are deteriorated in light resistance.

In addition, various pigments as described above have been frequently used in outdoor applications and, therefore, required to maintain a good hue thereof for a long period of time. Also, it is necessary that the pigments have a good light resistance, in particular, are free from discoloration by ultraviolet light.

Thus, it has been required to provide pigments exhibiting not only a clear hue, but also excellent tinting strength and light resistance.

Hitherto, in order to obtain pigments having excellent properties required for color pigments, it has been attempted to use the inorganic pigments in combination with the organic pigments. For example, there have been proposed a method of co-precipitating chrome yellow and phthalocyanine blue together; a method of adhering the organic pigments onto the surface of the inorganic pigments; or the like (Japanese Patent Application Laid-Open (KOKAI) Nos. 4-132770 (1992) and 11-181329 (1999), etc.). Further, there have been known particles exhibiting an excellent ultraviolet-absorbing property, which contain ultraviolet light-absorbing compounds (Japanese Patent Application Laid-Open (KOKAI) Nos. 11-222421 (1999) and 2000-80021, etc.).

At present, it has been strongly required to provide composite pigments not only being lessened in amount of organic pigments desorbed from the surface of white inorganic particles, but also exhibiting an excellent light resistance. However, conventional composite pigments have failed to satisfy these properties.

That is, in the case of the composite pigments obtained by co-precipitating chrome yellow and phthalocyanine blue together, the chrome yellow used therein has a toxicity, and a paint obtained using such composite pigments is deteriorated in storage stability owing to the co-precipitation production method. Further, a coating film obtained from the paint tends to suffer from color-floating in some cases.

In the method described in Japanese Patent Application Laid-Open (KOKAI) No. 4-132770 (1992), since the organic pigments are precipitated in the presence of the inorganic pigments, the adhesion of the organic pigments onto the inorganic pigments is insufficient.

In the method described in Japanese Patent Application Laid-Open (KOKAI) No. 11-181329 (1999), after the organic pigments are added to a solution prepared by dissolving organopolysiloxane in cyclic silicone solution, so as to be subjected to fine particle treatment, the obtained particles are adhered to high-oil absorption inorganic pigments, and then the cyclic silicone is volatilized therefrom. Therefore, the adhesion of the organic pigments onto the inorganic pigments is insufficient.

In Japanese Patent Application Laid-Open (KOKAI) No. 11-222421 (1999), it is described that an ultraviolet light-absorbing compound is bonded onto the surface of inorganic particles through a coupling agent. The object of the invention of this KOKAI is to provide an ultraviolet light-protecting agent having a good transparency, but not to provide composite pigments having a clear hue.

In Japanese Patent Application Laid-Open (KOKAI) No. 2000-80021, it is described that a liquid organic ultraviolet light-absorbing compound is coated onto inorganic pigments through an organic high-molecular compound. However, since the pigments are obtained by coat-treating inorganic particles, nylon powder or spherical silicone resin particles with the liquid organic ultraviolet light-absorbing compound, the obtained particles fail to show a clear hue.

Further, in Japanese Patent Application Laid-Open (KOKAI) No. 11-323174 (1999), there are described iron-based black composite particles comprising black iron oxide particles or black iron oxide hydroxide particles as core particles; a coating formed on the surface of the core particle, comprising organosilane compounds obtainable from alkoxysilanes; and a carbon black coat formed on the coating layer composed of the organosilane compounds. However, this KOKAI is directed to the technique for fixedly adhering carbon black onto the core particle and, therefore, the technical sphere of this KOKAI is quite different from that for obtaining pigments having a high chroma and exhibiting a more excellent light resistance, in particular, being free from dicolorationby ultraviolet light.

As a result of the present inventors' earnest studies for solving the above problems, it has been found that by forming an organic pigment coat onto the surface of white inorganic particles through a coating composed of organosilane compounds obtainable from alkoxysilanes, or polysiloxanes, and allowing an ultraviolet light-absorbing agent to exist in any portion from the surface of the white inorganic particle to the surface of the organic pigment coat (including such a case where the ultraviolet light-absorbing agent is adhered onto the organic pigment coat), the obtained organic and inorganic composite particles not only exhibit an excellent clear hue and an excellent light resistance, but also contain no harmful elements. The present invention has been attained on the basis of the above finding.

SUMMARY OF THE INVENTION

An object of the present invention is to provide organic and inorganic composite pigments being lessened in amount of organic pigments desorbed from the surface of the white inorganic particles, exhibiting an excellent clear hue and an excellent light resistance, and containing no harmful elements.

To accomplish with the aim, in a first aspect of the present invention, there are provided organic and inorganic composite pigments having an average particle diameter of 0.01 to 10.0 µm, comprising:

white inorganic particles;

a coating formed on surface of said white inorganic particle, comprising organosilane compounds obtainable from alkoxysilanes, or polysiloxanes;

an organic pigment coat formed on said coating in an amount of 1 to 200 parts by weight based on 100 parts by weight of the white inorganic particles; and an ultraviolet light-absorbing agent existing in at least a part of any portion from the surface of said white inorganic particle to surface of said organic pigment coat.

In a second aspect of the present invention, there are provided organic and inorganic composite pigments having an average particle diameter of 0.01 to 10.0 µm, comprising:

white inorganic particles;

a coating layer formed on surface of said white inorganic particle, comprising at least one compound selected from the group consisting of hydroxides of aluminum, oxides of aluminum, hydroxides of silicon and oxides of silicon;

a coating formed said coating layer, comprising organosilane compounds obtainable from alkoxysilanes, or polysiloxanes;

an organic pigment coat formed on said coating in an amount of 1 to 200 parts by weight based on 100 parts by weight of the white inorganic particles; and an ultraviolet light-absorbing agent existing in at least a part of any portion from the surface of said white inorganic particle to surface of said organic pigment coat.

In a third aspect of the present invention, there are provided organic and inorganic composite pigments having an average particle diameter of 0.01 to 10.0 µm, comprising:

white inorganic particles;

a coating formed on surface of said white inorganic particle, comprising organosilane compounds obtainable from alkoxysilanes, or polysiloxanes;

an organic pigment coat formed on said coating in an amount of 1 to 200 parts by weight based on 100 parts by weight of the white inorganic particles; and an ultraviolet light-absorbing agent existing in at least a part of a portion selected from the group consisting of (1) a portion between the surface of the white inorganic particle and the coating comprising organosilane compounds obtainable from alkoxysilanes, or polysiloxanes; (2) an inside portion of the coating comprising organosilane compounds obtainable from alkoxysilanes, or polysiloxanes; (3) a portion between the coating comprising organosilane compounds obtainable from alkoxysilanes, or polysiloxanes, and the organic pigment coat; (4) an inside portion of the organic pigment coat formed onto the coating comprising organosilane compounds obtainable from alkoxysilanes, or polysiloxanes; and (5) a portion on surface of the organic pigment coat.

In a fourth aspect of the present invention, there are provided organic and inorganic composite pigments having an average particle diameter of 0.01 to 10.0 µm, a BET specific surface area value of 1.0 to 100 m$^2$/g and a light resistance ($\Delta E^*$ value) of not more than 3.5, comprising:

white inorganic particles;

a coating formed on surface of said white inorganic particle, comprising organosilane compounds obtainable from alkoxysilanes, or polysiloxanes;

an organic pigment coat formed on said coating in an amount of 1 to 200 parts by weight based on 100 parts by weight of the white inorganic particles; and an ultraviolet light-absorbing agent existing in at least a part of any portion from the surface of said white inorganic particle to surface of said organic pigment coat.

In a fifth aspect of the present invention, there is provided a paint comprising:

said organic and inorganic composite pigments defined in any one of the first aspect to fourth aspect; and a paint base material.

In a sixth aspect of the present invention, there is provided a rubber or resin composition comprising:

said organic and inorganic composite pigments defined in any one of the first aspect to fourth aspect; and a base material for rubber or resin composition.

DETAILED DESCRIPTION OF THE INVENTION

The present invention will now be described in detail below.

First, the organic and inorganic composite pigments according to the present invention are described.

As the white inorganic particles, there may be used white pigments such as titanium dioxide and zinc oxide; pearl pigments such as titanium mica and muscovite; and extender pigments such as clay, calcium carbonate, precipitated barium sulfate, alumina white, white carbon and talc. The white inorganic particles may be appropriately selected from the above-described pigments depending properties required therefor or applications thereof, for example, the white pigments are preferably used in applications requiring a hiding power, the pearl pigments are preferably used in applications requiring pearl-like gloss, and the extender pigments are preferably used in applications requiring a transparency.

The white inorganic particles may be those particles having any suitable shape such as spherical particles, granular particles, polyhedral particles, acicular particles, spindle-shaped particles, rice ball-shaped particles, flake-shaped particles, scale-shaped particles and plate-shaped particles.

The white inorganic particles have an average particle diameter of usually 0.009 to 9.95 µm, preferably 0.025 to 9.45 µm, more preferably 0.045 to 8.95 µm.

When the average particle diameter of the white inorganic particles is more than 9.95 µm, the obtained organic and inorganic composite pigments may become coarse, resulting in deteriorated tinting strength. When the average particle diameter of the white inorganic particles is less than 0.009 µm, such particles may tend to be agglomerated due to fine particles. As a result, it may be difficult to adhere the ultraviolet light-absorbing agent onto the surface of the white inorganic particles, to form a uniform coating comprising the organosilane compounds obtainable from alkoxysilanes, or polysiloxanes on the surface of the white inorganic particles, and to uniformly adhere the organic pigments onto the surface of the coating layer.

The white inorganic particles have a BET specific surface area value of preferably not less than 0.5 m²/g. When the BET specific surface area value is less than 0.5 m²/g, the white inorganic particles may become coarse, so that the obtained organic and inorganic composite pigments may also become coarse and, therefore, may tend to be deteriorated in tinting strength. In the consideration of a good tinting strength of the obtained organic and inorganic composite pigments, the BET specific surface area value of the white inorganic particles is more preferably not less than 1.0 m²/g, still more preferably not less than 1.5 m²/g. In the consideration of adhering the ultraviolet light-absorbing agent onto the surface of the white inorganic particles, forming a uniform coating comprising the organosilane compounds obtainable from alkoxysilanes or polysiloxanes on the surface of the white inorganic particles, or uniformly forming the organic pigments coat onto the surface of the coating layer, the upper limit of the BET specific surface area value of the white inorganic particles is preferably 95 m²/g, more preferably 90 m²/g, still more preferably 85 m²/g.

As to the hue of the white inorganic particles, the L* value thereof is preferably not less than 70.00, more preferably not less than 75.00; and the C* value thereof is preferably not more than 18.00, more preferably not more than 16.00. When the L* and C* values of the white inorganic particles are out of the above-specified ranges, the white inorganic particles fail to show a white color, so that it may be difficult to obtain the aimed organic and inorganic composite pigments exhibiting a clear hue.

As to the hiding power of the white inorganic particles used in the present invention, the white pigments have a hiding power of preferably not less than 600 cm²/g; and the pearl pigments and extender pigments have a hiding power of less than 600 cm²/g when measured by the below-mentioned evaluation method.

As to the light resistance of the white inorganic particles, the $\Delta E^*$ value thereof is preferably not more than 12.0, more preferably not more than 11.0, still more preferably not more than 10.0 when measured by the below-mentioned evaluation method. The lower limit of the light resistance ($\Delta E^*$ value) of the white inorganic particles is usually about 4.0 or slightly higher.

As organosilicon compounds (gluing agents) used in the present invention, at least one organosilicon compound selected from the group consisting of (1) organosilane compounds obtained from alkoxysilane compounds; and (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) can be produced from alkoxysilane compounds represented by the formula (I):

$$R^1{}_a SiX_{4-a} \quad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

Specific examples of the alkoxysilane compounds may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like. Among these alkoxysilane compounds, in view of the degree of desorption and the adhering effect of the organic pigments, methyltriethoxysilane, methyltrimethoxysilane, dimethyldimethoxysilane and isobutyltrimethoxysilane, phenyltriethyoxysilane are preferred, and methyltriethoxysilane and methyltrimethoxysilane are more preferred.

As the polysiloxanes (2), there may be used those compounds represented by the formula (II):

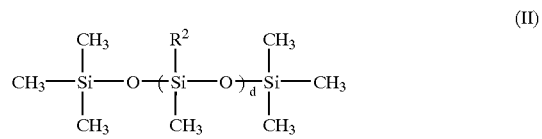

wherein $R^2$ is H— or $CH_3$—, and d is an integer of 15 to 450.

As the modified polysiloxanes (2-A), there may be used:

(a1) polysiloxanes modified with polyethers represented by the formula (III):

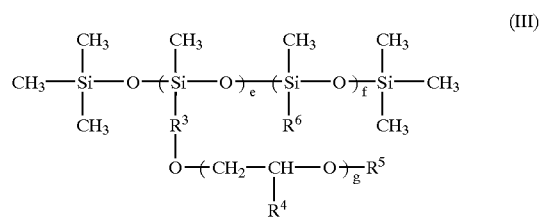

wherein $R^3$ is —(—CH2—)$_h$—; $R^4$ is —(—CH$_2$—)$_i$—CH$_3$; $R^5$ is —OH, —COOH, —CH=CH$_2$, —CH(CH$_3$)=CH$_2$ or —(—CH$_2$—)$_j$—CH$_3$; $R^6$ is —(—CH$_2$—)$_k$—CH$_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

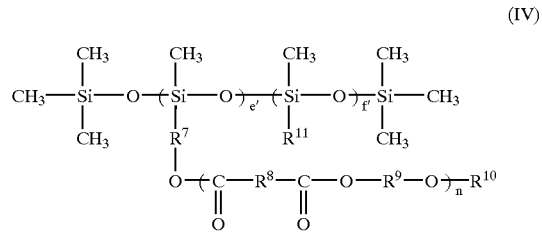

wherein $R^7$, $R^8$ and $R^9$ are —(—CH$_2$—)$_q$— and may be the same or different; $R^{10}$ is —OH, —COOH, —CH=CH$_2$, —CH(CH$_3$)=CH$_2$ or —(—CH$_2$—)$_r$—CH$_3$; $R^{11}$ is —(—CH$_2$—)$_s$—CH$_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

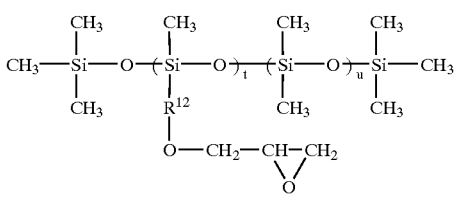

(V)

wherein $R^{12}$ is —(—$CH_2$—)$_v$—; v is an integer of 1 to 15; t is an integer of 1 to 50; and u is an integer of 1 to 300; or a mixture thereof.

As the terminal-modified polysiloxanes (2-B), there may be used those represented by the formula (VI):

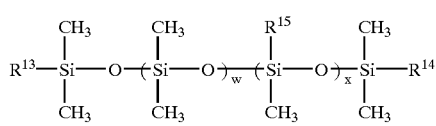

(VI)

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —(—$CH_2$—)$_y$—; wherein y is an integer of 1 to 15; w is an integer of 1 to 200; and x is an integer of 0 to 100.

In view of the desorption percentage and the adhering effect of the organic pigment, polysiloxanes having methyl hydrogen siloxane units, the polysiloxanes modified with the polyethers and the polysiloxanes whose terminals are modified with carboxylic acid groups are preferred.

The amount of the coating layer composed of the organosilane compounds obtained from alkoxysilane compounds, or polysiloxanes is preferably 0.01 to 15.0% by weight, more preferably 0.02 to 12.5% by weight, still more preferably 0.03 to 10.0% by weight (calculated as C) based on the weight of the gluing agent-coated white inorganic particles coated with the organosilane compounds or polysiloxanes.

When the amount of the coating layer composed of the organosilane compounds or polysiloxanes is less than 0.01% by weight, it may be difficult to coat and/or adhere not less than one part by weight of the organic pigment onto 100 parts by weight of the white inorganic particles. When the amount of the coating layer composed of the organosilane compounds or polysiloxanes is more than 15.0% by weight, since it is possible to coat and/or adhere 1 to 200 parts by weight of the organic pigment onto 100 parts by weight of the white inorganic particles therethrough, it is unnecessary to form the coating layer composed of the organosilane compounds or polysiloxanes in an amount of more than 15.0% by weight.

As the organic pigments used in the present invention, there may be exemplified various organic pigments ordinarily used as colorants for paints and resin compositions such as organic red-based pigments, organic blue-based pigments, organic yellow-based pigments, organic green-based pigments, or the like.

Examples of the organic red-based pigments may include quinacridon pigments such as quinacridon red, azo-based pigments such as permanent red, condensed azo pigments such as condensed azo red, perylene pigments such as perylene red, or the like. Examples of the organic blue-based pigments may include phthalocyanine-based pigments such as metal-free phthalocyanine blue, phthalocyanine blue and fast sky blue, alkali blue, or the like. Examples of the organic yellow-based pigments may include monoazo-based pigments such as Hanza yellow, disazo-based pigments such as benzidine yellow and permanent yellow, condensed azo pigments such as condensed azo yellow, or the like. Examples of the organic green-based pigments may include phthalocyanine-based pigments such as phthalocyanine green, or the like.

Meanwhile, various organic pigments as described above may be used in the form of a mixture of any two or more thereof according to the hue required.

The amount of the organic pigments adhered in the form of the coating layer is usually 1 to 200 parts by weight based on 100 parts by weight of the white inorganic particles.

When the amount of the organic pigments coat is less than 1 part by weight or more than 200 parts by weight, it may be difficult to obtain the aimed organic and inorganic composite pigments. The amount of the organic pigments adhered in the form of the coating layer is preferably 1 to 175 parts by weight, more preferably 1 to 150 parts by weight.

Examples of the ultraviolet light-absorbing agent used in the present invention may include benzotriazole-based ultraviolet light-absorbing agents, benzophenone-based ultraviolet light-absorbing agents and salicylate-based ultraviolet light-absorbing agents. Specific examples of the benzotriazole-based ultraviolet light-absorbing agents may include hydroxyphenylbenzotriazole derivatives, methyl-3-(3-t-butyl-5-(2H-benzotriazole-2-yl)-4-hydroxyphenyl)propionate-polyethylene glycol, 2-(5-methyl-2-hydroxyphenyl)benzotriazole, 2-(2-hydroxy-3,5-bis(α,α-dimethylbenzyl)phenyl)-2H-benzotriazole, 2-(3,5-di-t-butyl-2-hydroxyphenyl)benzotriazole, 2-(3-t-butyl-5-methyl-2-hydroxyphenyl)-5-chlororbenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5-t-octylphenyl)benzotriazole or the like. Specific examples of the benzophenone-based ultraviolet light-absorbing agents may include 2-hydroxy-4-methoxybenzophenone, 2,2'-dihydroxy-4-methoxybenzophenone, 2-hydroxy-4-methoxy-4'-chlorobenzophenone, 2,2'-dihydroxy-4-n-octoxybenzophenone, 2-hydroxy-4-n-octoxybenzophenone, 2,4-dihydroxybenzophenone, 2,4-dibenzoyl-resorcinol, resorcinol monobenzoate, 5-chloro-2-hydroxybenzophenone, 2,2'-dihydroxy-4,4'-dimethoxybenzophenone, 4-dodecyl-2-hydroxybenzophenone, 2,2', 4,4'-tetrahydroxybenzophenone or the like. Specific examples of the salicylate-based ultraviolet light-absorbing agents may include phenyl salicylate, 4-t-butyl-phenyl salicylate, p-octyl-phenyl salicylate or the like. In the consideration of good light resistance of the obtained organic and inorganic composite pigments, the benzotriazole-based ultraviolet light-absorbing agents are preferred, and further in the consideration of formation of more uniform coating layer, liquid ultraviolet light-absorbing agents such as hydroxyphenylbenzotriazole derivatives, methyl-3-(3-t-butyl-5-(2H-benzotriazole-2-yl)-4-hydroxyphenyl)propionate-polyethylene glycol and the like are preferred.

The amount of the ultraviolet light-absorbing agent existing in the organic and inorganic composite pigments is preferably 0.1 to 20% by weight, more preferably 0.1 to 18% by weight, still more preferably 0.1 to 15% by weight based on the weight of the organic pigments coated.

When the amount of the ultraviolet light-absorbing agent existing in the organic and inorganic composite pigments is less than 0.1% by weight, the obtained organic and inorganic composite pigments may tend to be deteriorated in light resistance. When the amount of the ultraviolet light-absorbing agent existing in the organic and inorganic composite pigments is more than 20% by weight, the effect of improving the light resistance is already saturated. Therefore, it is unnecessary and meaningless to make the ultraviolet light-absorbing agent exist in the organic and inorganic composite pigments in such a large amount.

The ultraviolet light-absorbing agent may exist in any suitable portion of the organic and inorganic composite pigments to impart a good ultraviolet light-absorbing property thereto. More specifically, the ultraviolet light-absorbing agent may exist in at least a part of any portion selected from the group consisting of (1) a portion between the surface of the white inorganic particle and the coating comprising organosilane compounds obtainable from alkoxysilanes, or polysiloxanes as a coating layer; (2) an inside portion of the coating comprising organosilane compounds obtainable from alkoxysilanes, or polysiloxanes; (3) a portion between the coating formed on the surface of the white inorganic particle, comprising organosilane compounds obtainable from alkoxysilanes, or polysiloxanes, and the organic pigment coat as a coating layer; (4) an inside portion of the organic pigment coat adhered onto the coating comprising organosilane compounds obtainable from alkoxysilanes, or polysiloxanes; and (5) a portion on the surface of the organic pigment coat as a coating layer, i.e., on the surface of the composite particle. Preferably, the ultraviolet light-absorbing agent may be present in either (4) or (5).

In the above-mentioned embodiment (1), the ultraviolet light-absorbing agent may exist on at least a part of the surface of the white inorganic particle as a coating layer; in the above-mentioned embodiment (3), the ultraviolet light-absorbing agent may exist on at least a part of the surface of the coating comprising organosilane compounds obtainable from alkoxysilanes, or polysiloxanes as a coating layer, and in the above-mentioned embodiment (5), the ultraviolet light-absorbing agent may exist on at least a part of the surface of the organic pigment coat as a coating layer.

The particle shape and particle size of the organic and inorganic composite pigments according to the present invention may largely depend upon those of the white inorganic particles as core particles. Specifically, the organic and inorganic composite pigments may have a particle configuration similar to that of the core particles.

More specifically, the organic and inorganic composite pigments of the present invention have an average particle diameter of usually 0.01 to 10.0 $\mu$m, preferably 0.03 to 9.5 $\mu$m more preferably 0.05 to 9.0 $\mu$m.

When the average particle diameter of the organic and inorganic composite pigments is more than 10.0 $\mu$m, the particle size thereof is too large, resulting in deteriorated tinting strength. When the average particle diameter of the organic and inorganic composite pigments is less than 0.01 $\mu$m, such organic and inorganic composite pigments tend to be agglomerated together due to fine particles, so that it may become difficult to disperse the organic and inorganic composite pigments in paint vehicles or resin compositions.

The organic and inorganic composite pigments of the present invention have a BET specific surface area value of preferably 1.0 to 100 m$^2$/g, more preferably 1.5 to 95 m$^2$/g, still more preferably 2.0 to 90 m$^2$/g. When the BET specific surface area value is less than 1.0 m$^2$/g, the obtained organic and inorganic composite pigments may become coarse, resulting in deteriorated tinting strength. When the BET specific surface area value is more than 100 m$^2$/g, the organic and inorganic composite pigments tend to be agglomerated together due to fine particles, so that it may be difficult to disperse the organic and inorganic composite pigments in paint vehicles or resin compositions.

The organic and inorganic composite pigments of the present invention have a tinting strength of preferably not less than 115%, more preferably not less than 120% when measured by the below-mentioned evaluation method.

The hiding power of the organic and inorganic composite pigments produced by using white pigments as the white inorganic particles is preferably not less than 600 cm$^2$/g, more preferably not less than 700 cm$^2$/g when measured by the below-mentioned evaluation method. Also, the hiding power of the organic and inorganic composite pigments produced by using extender pigments or pearl pigments as the white inorganic particles is preferably less than 600 cm$^2$/g, more preferably not more than 500 cm$^2$/g when measured by the below-mentioned evaluation method.

As to the light resistance of the organic and inorganic composite pigments of the present invention, the $\Delta E^*$ value thereof is preferably not more than 3.5, more preferably not more than 3.0 when measured by the below-mentioned evaluation method.

The degree of desorption of organic pigments from the organic and inorganic composite pigments is preferably rank 4 or rank 5, more preferably rank 5. When the degree of desorption of organic pigments from the organic and inorganic composite pigments is rank 1, 2 or 3, the organic and inorganic composite pigments may tend to be inhibited from being uniformly dispersed in paint vehicles or resin compositions, because of the desorbed organic pigments. Further, since the hue of the white inorganic particles is exposed to the surface of the composite particles at the portion from which the organic pigments are desorbed, it may be difficult to obtain organic and inorganic composite pigments having a uniform hue.

In the organic and inorganic composite particles according to the present invention, if required, the surface of the core particle may be previously coated with at least one compound selected from the group consisting of hydroxides of aluminum, oxides of aluminum, hydroxides of silicon and oxides of silicon. The organic and inorganic composite particles using the core particles having such a coat composed of at least one compound selected from the group consisting of hydroxides of aluminum, oxides of aluminum, hydroxides of silicon and oxides of silicon (hereinafter referred to merely as "intermediate coat"), can be more effectively reduced in amount of organic pigments desorbed from the surface of the composite particles as compared to those using the core particles having no intermediate coat.

The amount of the intermediate coat is preferably 0.01 to 20% by weight (calculated as Al, SiO$_2$ or a sum of Al and SiO$_2$) based on the weight of the core particles having the intermediate coat.

When the amount of the intermediate coat is less than 0.01% by weight, it may be difficult to attain the improved effect of reducing the amount of organic pigments desorbed. As long as the amount of the intermediate coat is in the range of 0.01 to 20% by weight, the improved effect of reducing the amount of organic pigments desorbed can be sufficiently attained. Therefore, it is unnecessary to form the intermediate coat in an amount of more than 20% by weight.

The organic and inorganic composite pigments produced by using the white inorganic particles coated with at least one compound selected from the group consisting of hydroxides of aluminum, oxides of aluminum, hydroxides of silicon and oxides of silicon according to the present invention is substantially the same in particle size, BET specific surface area value, hue (L*, a* and b* values), tinting strength and hiding power as those of the organic and inorganic composite pigments produced by using the white inorganic particles uncoated with at least one compound selected from the group consisting of hydroxides of aluminum, oxides of aluminum, hydroxides of silicon and oxides of silicon according to the present invention. The degree of desorption of the organic pigments from the organic and inorganic composite pigments can be improved by coating the surface of the white inorganic particles with at least one compound selected from the group consisting of hydroxides of aluminum, oxides of aluminum, hydroxides of silicon and oxides of silicon, so that the obtained organic and inorganic composite pigments can show a degree of desorption of the organic pigments of preferably the rank 5, and a light resistance ($\Delta E^*$ value) of preferably not more than 3.0, more preferably not more than 2.5.

Next, the paint containing the organic and inorganic composite pigments of the present invention is described.

The solvent-based paint containing the organic and inorganic composite pigments of the present invention has such a storage stability that the $\Delta E^*$ value thereof is preferably not more than 1.5, more preferably not more than 1.2. When the paint is formed into a coating film, the gloss of the coating film is preferably 75 to 110%, more preferably 80 to 110%. As to the light resistance of the coating film, the $\Delta E^*$ value thereof is preferably not more than 3.5, more preferably not more than 3.0. In the case where extender pigments or pearl pigments are used as the white inorganic particles, the coating film has such a transparency that the linear absorption thereof is preferably not more than 0.10 $\mu m^{-1}$, more preferably not more than 0.09 $\mu m^{-1}$.

The solvent-based paint containing the organic and inorganic composite pigments coated with at least one compound selected from the group consisting of hydroxides of aluminum, oxides of aluminum, hydroxides of silicon and oxides of silicon, of the present invention has such a storage stability that the $\Delta E^*$ value thereof is preferably not more than 1.5, more preferably not more than 1.2. When the paint is formed into a coating film, the gloss of the coating film is preferably 80 to 115%, more preferably 85 to 115%. As to the light resistance of the coating film, the $\Delta E^*$ value thereof is preferably not more than 3.0, more preferably not more than 2.5. In the case where extender pigments or pearl pigments are used as the white inorganic particles, the coating film has such a transparency that the linear absorption thereof is preferably not more than 0.10 $\mu m^{-1}$, more preferably not more than 0.09 $\mu m^{-1}$.

The water-based paint containing the organic and inorganic composite pigments of the present invention has such a storage stability that the $\Delta E^*$ value thereof is preferably not more than 1.5, more preferably not more than 1.2. When the paint is formed into a coating film, the gloss of the coating film is preferably 70 to 110%, more preferably 75 to 110%. As to the light resistance of the coating film, the $\Delta E^*$ value thereof is preferably not more than 3.5, more preferably not more than 3.0. In the case where extender pigments or pearl pigments are used as the white inorganic particles, the coating film has such a transparency that the linear absorption thereof is preferably not more than 0.11 $\mu m^{-1}$, more preferably not more than 0.10 $\mu m^{-1}$.

The water-based paint containing the organic and inorganic composite pigments coated with at least one compound selected from the group consisting of hydroxides of aluminum, oxides of aluminum, hydroxides of silicon and oxides of silicon has such a storage stability that the $\Delta E^*$ value thereof is preferably not more than 1.5, more preferably not more than 1.2. When the paint is formed into a coating film, the gloss of the coating film is preferably 75 to 115%, more preferably 80 to 115%. As to the light resistance of the coating film, the $\Delta E^*$ value thereof is preferably not more than 3.0, more preferably not more than 2.5. In the case where extender pigments or pearl pigments are used as the white inorganic particles, the coating film has such a transparency that the linear absorption thereof is preferably not more than 0.11 $\mu m^{-1}$, more preferably not more than 0.10 $\mu m^{-1}$.

The amount of the organic and inorganic composite particles blended in the paint according to the present invention is in the range of usually 0.5 to 100 parts by weight based on 100 parts by weight of a paint base material. In the consideration of handling of the paint, the amount of the organic and inorganic composite particles blended in the paint is preferably 1.0 to 100 parts by weight, more preferably 2.0 to 100 parts by weight based on 100 parts by weight of the paint base material.

The paint base material comprises a resin and a solvent, and may further contain, if required, a defoamer, an extender pigment, a drying agent, a surfactant, a hardening accelerator, an assistant, or the like.

Examples of the resin used in the paint base material may include resins ordinarily used for solvent-based paints such as acrylic resins, alkyd resins, polyester resins, polyurethane resins, epoxy resins, phenol resins, melamine resins, amino resins, or the like. Examples of the resins used in the paint base material for water-based paints may include resins ordinarily used for water-based paints such as water-soluble alkyd resins, water-soluble melamine resins, water-soluble acrylic resins, water-soluble urethane emulsion resins, or the like.

As the solvent for solvent-based paints, there may be exemplified those solvents ordinarily used for solvent-based paints such as toluene, xylene, thinner, methyl isobutyl ketone, glycol ether-based solvents such as ethyl cellosolve and butyl cellosolve, alcohol-based solvents such as butyl alcohol, aliphatic hydrocarbon-based solvents such as hexane, or the like.

As the solvents for water-based paints, there may be used a mixture of water and a water-soluble organic solvent ordinarily used for water-based paints such as glycol ether-based solvents such as butyl cellosolve, alcohol-based solvents such as butyl alcohol, or the like As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382. (tradename)" (all produced by SUN NOPCO CO., LTD.), "ANTI-FOAM 08 (tradename)" and "EMARGEN 903 (tradename)" (both produced by KAO CO., LTD.), or the like.

Next, the resin composition colored with the organic and inorganic composite pigments of the present invention is described.

The resin composition colored with the organic and inorganic composite pigments of the present invention exhibits a dispersibility of preferably rank 4 or 5, more preferably rank 5 when visually observed by the below-mentioned evaluation method, and a light resistance ($\Delta E^*$ value) of preferably not more than 3.5, more preferably not more than 3.0. Meanwhile, when extender pigments or pearl pigments are used as the white inorganic particles, the resin composition has such a transparency that the linear absorption thereof is preferably not more than 0.10 $\mu m^{-1}$, more preferably not more than 0.09 $\mu m^{-1}$.

The resin composition colored with the organic and inorganic composite pigments coated with at least one compound selected from the group consisting of hydroxides of aluminum, oxides of aluminum, hydroxides of silicon and oxides of silicon, of the present invention exhibits a dispersibility of preferably rank 4 or 5, more preferably rank 5 when visually observed by the below-mentioned evaluation method, and a light resistance ($\Delta E^*$ value) of preferably not more than 3.0, more preferably not more than 2.5. Meanwhile, when extender pigments or pearl pigments are used as the white inorganic particles, the resin composition has such a transparency that the linear absorption thereof is preferably not more than 0.10 $\mu m^{-1}$, more preferably not more than 0.09 $\mu m^{-1}$.

The amount of the organic and inorganic composite particles blended in the resin composition according to the present invention is usually in the range of 0.01 to 200 parts by weight based on 100 parts by weight of the resin. In the consideration of handling of the resin composition, the amount of the organic and inorganic composite particles blended therein is preferably 0.05 to 150 parts by weight, more preferably 0.1 to 100 parts by weight based on 100 parts by weight of the resin.

The base material of the resin composition according to the present invention comprises the organic and inorganic composite particles and known thermoplastic resins, and may further contain, if required, additives such as lubricants, plasticizers, antioxidants, ultraviolet light absorbers, various stabilizers or the like.

As the reins, there may be used natural rubbers; synthetic rubbers; thermoplastic resins, e.g., polyolefins such as polyethylene, polypropylene, polybutene and polyisobutylene, polyvinyl chloride, styrene polymers or polyamides, or the like.

The additives may be added in an amount of usually not more than 50% by weight based on the total amount of the organic and inorganic composite particles and the resin. When the amount of the additives added is more than 50% by weight, the obtained resin composition may be deteriorated in moldability.

The resin composition is produced by previously intimately mixing the raw resin material with the organic and inorganic composite particles, and then kneading the resultant mixture using a kneader or an extruder under heating while applying a strong shear force thereto in order to deaggregate the agglomerated organic and inorganic composite particles, and uniformly disperse the organic and inorganic composite particles in the resin. Then, the obtained resin composition is molded into an aimed shape upon use.

Next, the process for producing the organic and inorganic composite pigments of the present invention is described.

The organic and inorganic composite pigments of the present invention can be produced by conducting essential steps of (i) mixing white inorganic particles with alkoxysilanes or polysiloxanes to form a coating comprising alkoxysilanes or polysiloxanes on the surface of the white inorganic particle; and (ii) then mixing the white inorganic particles coated with alkoxysilanes or polysiloxanes thereon with organic pigments to form an organic pigment coat on the coating layer composed of alkoxysilanes or polysiloxanes, in combination with a step of incorporating an ultraviolet light-absorbing agent in any suitable portion of the organic and inorganic composite pigments.

More specifically, the organic and inorganic composite pigments can be produced by any of the following methods (1) to (5):

(1) Method of preliminarily mixing the white inorganic particles with the ultraviolet light-absorbing agent to adhere the ultraviolet light-absorbing agent onto the surface of the white inorganic particle; successively mixing alkoxysilanes or polysiloxanes with white inorganic particles adhered with the ultraviolet light-absorbing agent to form a coating comprising alkoxysilanes or polysiloxanes on the surface of the white inorganic particle adhered with the ultraviolet light-absorbing agent; and then mixing organic pigments with the white inorganic particles coated with alkoxysilanes or polysiloxanes to form an organic pigment coat on the coating layer composed of alkoxysilanes or polysiloxanes.

(2) Method of preliminarily mixing alkoxysilanes or polysiloxanes with the ultraviolet light-absorbing agent to prepare a mixture thereof; mixing white inorganic particles with the resultant mixture to form a coating composed of the mixture of the alkoxysilanes or polysiloxanes and the ultraviolet light-absorbing agent on the surface of the white inorganic particle; and then mixing the thus obtained particles with organic pigments to form an organic pigment coat on the coating composed of the mixture.

(3) Method of mixing white inorganic particles with alkoxysilanes or polysiloxanes to form a coating composed of alkoxysilanes or polysiloxanes on the surface of the white inorganic particle; mixing the ultraviolet light-absorbing agent with white inorganic particles coated with comprising alkoxysilanes or polysiloxanes to adhere the ultraviolet light-absorbing agent onto the coating composed of alkoxysilanes or polysiloxanes; and then mixing organic pigments with the particles adhered with the ultraviolet light-absorbing agent to form an organic pigment coat on the particles adhered with the ultraviolet light-absorbing agent.

(4) Method of mixing white inorganic particles with alkoxysilanes or polysiloxanes to form a coating composed of alkoxysilanes or polysiloxanes on the surface of the white inorganic particle; and simultaneously adding both organic pigments and the ultraviolet light-absorbing agent to white inorganic particles coated with alkoxysilanes or polysiloxanes to form a organic pigment coat containing the ultraviolet light-absorbing agent on the coating composed of alkoxysilanes or polysiloxanes.

(5) Method of mixing white inorganic particles with alkoxysilanes or polysiloxanes to form a coating composed of alkoxysilanes or polysiloxanes on the surface of the white inorganic particle; mixing organic pigments with the white inorganic particles coated with alkoxysilanes or polysiloxanes to form an organic pigment coat on the coating layer composed of alkoxysilanes or polysiloxanes; and then mixing the obtained composite particles with the ultraviolet light-absorbing agent to adhere the ultraviolet light-absorbing agent onto the surface of the organic pigment coat, i.e., onto the surface of the composite particle.

The mixing of the ultraviolet light-absorbing agent with the respective particles may be conducted by mechanically mixing and stirring the particles with the ultraviolet light-absorbing agent, or by mechanically mixing and stirring the particles and the ultraviolet light-absorbing agent while spraying a solution containing the ultraviolet light-absorbing agent onto the particles. Substantially whole amount of the ultraviolet light-absorbing agent added can be adhered on the surface of the particles.

The amount of the ultraviolet light-absorbing agent added is preferably 0.1 to 20 parts by weight, more preferably 0.1 to 18 parts by weight, still more preferably 0.1 to 15 parts by weight based on 100 parts by weight of the organic pigments adhered.

The coating with alkoxysilanes or polysiloxanes on the surface of the white inorganic particles or on the surface of the white inorganic particles adhered with the ultraviolet light-absorbing agent may be conducted by mechanically mixing and stirring the respective particles with the alkoxysilanes or polysiloxanes, or by mechanically mixing and stirring the respective particles and the alkoxysilanes or polysiloxanes while spraying a solution containing the alkoxysilanes, or the polysiloxanes onto the particles. Substantially whole amount of the alkoxysilanes or polysiloxanes added can be adhered onto the surface of the respective particles.

Meanwhile, a part of the alkoxysilanes adhered may be converted into organosilane compounds obtainable from the alkoxysilanes through the coating step. Even in such a case, the subsequent steps for adhesion of the organic pigments and the ultraviolet light-absorbing agent are not adversely affected.

In order to uniformly coat the surface of the white inorganic particles with the ultraviolet light-absorbing agent as well as the alkoxysilanes or polysiloxanes, it is preferred that the white inorganic particles are previously deaggregated using a crusher or pulverizer.

In the present invention, the mixing and stirring upon coating with the alkoxysilanes or polysiloxanes and upon adhesion with the organic pigments and the ultraviolet light-absorbing agent may be preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multi mill, Stotz mill, Wet pan mill, corner mill, ring muller or the like. Among these kneaders, preferred are edge runners, multi mill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the white inorganic particle with the alkoxysilane compounds or polysiloxanes. Specifically, the mixing and stirring conditions may be appropriately controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the alkoxysilanes or polysiloxanes added is preferably 0.15 to 45 parts by weight based on 100 parts by weight of the white inorganic particles. By adding the alkoxysilanes or polysiloxanes in an amount of 0.15 to 45 parts by weight, it is possible to adhere 1 to 200 parts by weight of the organic pigments onto 100 parts by weight of the white inorganic particles.

The amount of the organic pigments added is usually 1 to 200 parts by weight based on 100 parts by weight of the white inorganic particles. When the amount of the organic pigments added is out of the above-specified range, it may be difficult to obtain the aimed organic and inorganic composite pigments.

The organic pigments are preferably added slowly, in particular, for about 5 to 60 minutes.

The organic and inorganic composite pigments obtained after adhesion of the organic pigments may be subjected, if required, to drying or heating treatment.

The heating temperature used in the drying or heating treatment is preferably 40 to 150° C., more preferably 60 to 120° C., and the heating time is preferably 10 minutes to 12 hours, more preferably 30 minutes to 3 hours.

The alkoxysilanes used for coating the white inorganic particles in the organic and inorganic composite pigments are finally coated in the form of organosilane compounds obtainable from the alkoxysilanes through these treating steps.

The white inorganic particles may be preliminarily coated, if required, with a coat comprising at least one compound selected from the group consisting of hydroxides of aluminum, oxides of aluminum, hydroxides of silicon and oxides of silicon, prior to mixing and stirring with the alkoxysilane compounds or polysiloxanes.

The formation of the intermediate coat may be conducted by adding an aluminum compound, a silicon compound or both the aluminum and silicon compounds to a water suspension containing the white inorganic particles; mixing and stirring the resultant suspension, if required, followed by adequately adjusting the pH value thereof, thereby coating the white inorganic particles with at least one compound selected from the group consisting of hydroxides of aluminum, oxides of aluminum, hydroxides of silicon and oxides of silicon; and then subjecting the thus obtained particles to filtering-out, water-washing, drying and pulverization. Further, if required, the resultant particles may be subjected to deaeration, compaction or the like.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

The point of the present invention is that the organic and inorganic composite pigments of the present invention can exhibit not only a clear hue, but also a more excellent light resistance.

The reason why the organic and inorganic composite pigments of the present invention can exhibit a clear hue, is considered by the present inventors to be that the organic pigments having a clear hue are adhered onto the surface of the white inorganic particles, and prevented from being desorbed therefrom.

The reason why the organic pigments adhered to the organic and inorganic composite pigments can be prevented from being desorbed from the surface of the organic and inorganic composite pigments, is considered by the present inventors to be that the white inorganic particles and the organic pigment coat are strongly bonded to each other through the coating comprising organosilane compounds obtainable from alkoxysilanes, or polysiloxanes.

Further, in the organic and inorganic composite pigments of the present invention, the ultraviolet light-absorbing agent is caused to exist inside and/or on the organic and inorganic composite particles. Therefore, the organic and inorganic composite pigments are free from discoloration due to exposure to ultraviolet light and can exhibit a more excellent light resistance.

Another point of the present invention is that the paint containing the organic and inorganic composite pigments is excellent in light resistance, paint stability and dispersibility, and the resin composition containing the organic and inorganic composite pigments is excellent in light resistance and dispersibility.

The reason why the paint and resin composition of the present invention can exhibit an excellent light resistance, is considered by the present inventors to be that the organic and inorganic composite pigments contained therein are excellent in light resistance. Also, the reasons why the paint of the present invention can exhibit excellent paint stability and dispersibility, and the resin composition of the present invention can exhibit an excellent dispersibility, are considered by the present inventors to be that the paint and resin composition contain as colorant, the organic and inorganic composite pigments whose organic pigments are prevented from being desorbed from the surface of the organic and inorganic composite particles.

In addition, the organic and inorganic composite pigments of the present invention contain no harmful elements and compounds and, therefore, can provide pigments having excellent hygiene and safety and being free from environmental pollution.

Thus, the organic and inorganic composite pigments of the present invention are not only substantially free from desorption of organic pigments from the surface of the organic and inorganic composite particles, but also can exhibit a more excellent light resistance due to the ultraviolet light-absorbing agent contained therein and/or adhered thereon. Therefore, the organic and inorganic composite pigments of the present invention can be suitably used as a colorant in various applications.

The paint and resin composition of the present invention contain as color pigments, the organic and inorganic composite pigments being substantially free from desorption of organic pigments therefrom and exhibiting a more excellent light resistance and, therefore, are suitable as paints and resin compositions having a more excellent light resistance.

EXAMPLES

The present invention is described in more detail by Examples and Comparative Examples, but the Examples are only illustrative and, therefore, not intended to limit the scope of the present invention.

Various properties were evaluated by the following methods.

(1) The average particle diameter of the particles was expressed by the average value of diameters of 350 particles measured on a micrograph (×50,000).

(2) The specific surface area was expressed by the value measured by a BET method.

(3) The amounts of Al and Si present on the surface of white inorganic particle were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(4) The amount of the benzotriazole-based ultraviolet light-absorbing agent adhered was determined by measuring the amount of nitrogen using "Trace Whole Nitrogen Analyzer" (manufactured by MITSUBISHI KASEI CO., LTD.).

(5) The amount of the organic pigments adhered onto the surface of the white inorganic particle as well as the coating amount of organosilane compounds obtainable from alkoxysilanes, or polysiloxanes, were respectively expressed by the amount of carbon measured by "Horiba Metal, Carbon and Sulfur Analyzer EMIA-2200 Model" (manufactured by HORIBA SEISAKUSHO CO., LTD.).

(6) The degree of desorption of the organic pigments from the composite particles was visually observed and evaluated by the following method, and the observation results were classified into the following five ranks. The rank 5 represents that the amount of the organic pigments desorbed from the surface of the core particles was smallest.

That is, 2 g of the particles to be measured and 20 ml of ethanol were placed in a 50-ml conical flask and then was subjected to ultrasonic dispersion for 60 minutes. Thereafter, the obtained dispersion was centrifuged at a rotating speed of 10,000 rpm for 15 minutes to separate the particles from the solvent. The obtained particles were dried at 80° C. for one hour, and the micrograph thereof was visually observed to count the number of the desorbed and re-aggregated organic pigment particles present in visual field of the micrograph. The micrograph was compared with a micrograph of mixed particles obtained by simply mixing the core particles with the organic pigments without forming the gluing agent coating layer. The results are classified into the following five ranks.

Rank 1: Number of desorbed and re-aggregated particles was substantially the same as that in the simply mixed particles;

Rank 2: 30 to 49 desorbed and re-aggregated particles per 100 core particles were recognized;

Rank 3: 10 to 29 desorbed and re-aggregated particles per 100 core particles were recognized;

Rank 4: 5 to 9 desorbed and re-aggregated particles per 100 core particles were recognized; and Rank 5: 0 to 4 desorbed and re-aggregated particles per 100 core particles were recognized.

(7) The hue of each of the white inorganic particles, organic pigments and organic and inorganic composite particles, were measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 150 $\mu$m (6-mil) applicator to produce a coating film piece (having a film thickness of about 30 $\mu$m). The thus obtained coating film piece was measured by a Multi-Spectro-Colour-Meter "MSC-IS-2D" (manufactured by SUGA SHIKENKI CO., LTD..) to determine color specification values (L*, a* and b* values) thereof according to JIS Z 8729. Meanwhile, the C* value representing chroma is calculated according to the following formula:

$$C^* = ((a^*)^2 + (b^*)^2)^{1/2}$$

(8) The tinting strength of the organic and inorganic composite particles was measured by the following method.

That is, a primary color enamel and a vehicle enamel prepared by the below-mentioned method were respectively applied on a cast-coated paper by using a 150 $\mu$m (6-mil) applicator to produce coating film pieces. The thus obtained coating film pieces were measured by a Multi-Spectro-Colour-Meter "MSC-IS-2D" (manufactured by SUGA SHIKENKI CO., LTD.) to determine a color specification value (L* value) thereof according to JIS Z 8729. The difference between the obtained L* values was represented by a $\Delta L^*$ value.

Next, as a standard sample for the organic and inorganic composite particles, a mixed pigment was prepared by simply mixing the organic pigments and the white inorganic particles at the same mixing ratio as used for the production of the organic and inorganic composite particles. Using the thus prepared mixed pigment as standard sample, the same procedure as defined above was conducted to prepare an primary color enamel and a vehicle enamel, to form coating film pieces and to measure L* values thereof. The difference between the L* values was represented by a ΔLs* value.

From the obtained ΔL* value of the organic and inorganic composite particles and ΔLs* value of the standard sample, the tinting strength (%) was calculated according to the following formula:

Tinting strength (%)=100+{(ΔLs*−ΔL*)×10}

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining an primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(9) The hiding power of each of the white inorganic particles, organic pigments and organic and inorganic composite particles was measured by the crylptometer method according to JIS K5101-8.2 using the above-prepared primary color enamel.

(10) The light resistance of each of the each of the white inorganic particles, organic pigments and organic and inorganic composite particles was measured by the following method.

That is, the primary color enamel as prepared above was applied onto a cold-rolled steel plate (0.8 mm×70 mm×150 mm; JIS G-3141) and dried to form a coating film having a thickness of 150 μm. One half of the thus prepared test specimen was covered with a metal foil, and an ultraviolet light was continuously irradiated over the test specimen at an intensity of 100 mW/cm² for 10 hours using "EYE SUPER UV TESTER SUV-W13" (manufactured by IWASAKI DENKI CO., LTD.). Then, the hues (L*, a* and b* values) of the UV-irradiated portion and the metal foil-covered non-irradiated portion of the test specimen were respectively measured using a Multi-Spectro-Colour-Meter "MSC-IS-2D" (manufactured by SUGA SHIKENKI CO., LTD.) . The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(11) The hues of the solvent-based paint and water-based paint using the organic and inorganic composite particles were measured by the following method.

That is, the respective paints prepared by the below-mentioned methods, were applied onto a cold-rolled steel plate (0.8 mm×70 mm×150 mm; JIS G-3141) and dried to form a coating film having a thickness of 150 μm The thus obtained test specimens were measured by a Multi-Spectro-Colour-Meter (manufactured by SUGA SHIKENKI CO., LTD.) to determine color specification values (L*, a* and b* values) thereof according to JIS Z 8929. Also, the hue of the resin composition tinted with the composite particles was determined as follows. That is, the hue of a colored resin plate prepared by the below-mentioned method was measured by using a Multi-Spectro-Colour-Meter (manufactured by SUGA SHIKENKI CO., LTD.) by the same method as described above.

(12) The gloss of the coating film was measured by irradiating light at an incident angle of 60°, using "gloss meter UGV-5D" (manufactured by SUGA TESTING MACHINES MANUFACTURING CO., LTD.). The higher the gloss, the more excellent the dispersibility of the composite particles in the paint.

(13) The light resistances of coating films produced from the respective paints, were measured by the following method.

That is, one half of the same test specimen as prepared and used for measuring hues of the above paints, was covered with a metal foil, and an ultraviolet light was continuously irradiated over the test specimen at an intensity of 100 mW/cm² for 10 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the above-described formula.

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(14) The light resistance of the respective resin compositions was measured by the following method.

That is, one half of the above resin plate prepared for measuring the hue of the resin composition was covered with a metal foil, and an ultraviolet light was continuously irradiated over the resin plate at an intensity of 100 mW/cm² for 10 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the resin plate were respectively measured. The ΔE* value was calculated from differences between the measured hue values of the metal foil-covered non-irradiated portion and the UV-irradiated portion according to the above-mentioned formula.

(15) The transparency of the coating film using the organic and inorganic composite pigments was expressed by the linear absorption defined by the following formula. Specifically, the linear absorption was calculated from the light transmittance of a coating film produced by applying a paint prepared by the below-mentioned method on a 100 μm-thick clear base film. The light transmittance was measured using a self-recording photoelectric spectrophotometer "UV-2100" (manufactured by SHIMADZU SEISAKUSHO CO., LTD.).

Also, the transparency of the resin composition was expressed by the linear absorption of a resin plate prepared by the below-mentioned method, which was calculated from the light transmittance of the resin plate as similarly measured using the self-recording photoelectric spectrophotometer "UV-2100" (manufactured by SHTMADZU SEISAKUSHO CO., LTD.). The smaller the linear absorption, the higher the light transmittance and the higher the transparency.

$$\text{Linear absorption } (\mu m^{-1}) = \ln(1/t)/FT$$

wherein t is a light transmittance (−) at λ=900 nm; and FT is a thickness (μm) of the coating film or resin plate to be tested.

Preparation of Paint for Evaluation of Transparency:

5 g of sample particles and the other components shown 2<below were charged at the following weight ratio into a 250-ml glass bottle, and then mixed and dispersed therein together with 160 g of 3 mmφ glass beads for 120 minutes by a paint shaker, thereby preparing a mill base.

| Composition of mill base: | |
|---|---|
| Sample particles | 9.9 parts by weight |
| Melamine resin (SUPER PECKAMINE J-820-60 (tradename) produced by DAI-NIPPON INK KAGAKU KOGYO CO., LTD.) | 19.8 parts by weight |
| Alkyd resin (BECKOZOL 1307-6OEL (tradename) produced by DAI-NIPPON INK KAGAKU KOGYO CO., LTD.) | 39.6 parts by weight |
| Xylene | 29.7 parts by weight |
| Butanol | 1.0 part by weight |

Preparation of Water-based Paint for Evaluation of Transparency:

5 g of sample particles and the other components shown below were charged at the following weight ratio into a 250-ml glass bottle, and then mixed and dispersed therein together with 160 g of 3 mmφ glass beads for 120 minutes by a paint shaker, thereby preparing a mill base.

| Composition of mill base: | |
|---|---|
| Sample particles | 10.1 parts by weight |
| Water-based melamine resin (S-695 (tradename) produced by DAI-NIPPON INK KAGAKU KOGYO CO., LTD.) | 9.3 parts by weight |
| Water-based alkyd resin (S-118 (tradename) produced by DAI-NIPPON INK KAGAKU KOGYO CO., LTD.) | 40.7 parts by weight |
| Defoamer (NOPCO 8034 (tradename) produced by SUN NOPCO CO., LTD.) | 0.2 part by weight |
| Water | 28.2 parts by weight |
| Butyl cellosolve | 11.5 parts by weight |

Preparation of Resin Composition for Evaluation of Transparency:

0.5 g of sample particles and 49. 5 g of polyvinyl chloride resin particles ("103EP8D" (tradename), produced by NIPPON ZEON CO., LTD.) were weighed and charged into a 100 ml beaker made of a resin, and intimately mixed together by a spatula, thereby obtaining mixed particles.

1.0 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate. Next, the thus-produced resin composition was interposed between a pair of surface-polished stainless steel plates, placed within a hot press heated to 180° C., and then subjected to a pressure molding while applying a pressure of 98,000 kPa (1 ton/cm²) thereto, thereby obtaining a colored resin plate having a thickness of 1 mm.

(16) The storage stability of the paint was measured by the following method.

That is, the respective paints prepared by the below-mentioned method were applied onto a cold-rolled steel plate (0.8 mm×70 mm×150 mm; JIS G-3141) and dried to form a coating film having a thickness of 150 μm. Then, the L*, a* and b* values of the thus prepared coating film were measured. Separately, the respective paints were allowed to stand at 25° C. for one week, and then applied onto the cold-rolled steel plate and dried to form a similar coating film. The L*, a* and b* values of the thus prepared coating film were also measured. The ΔE* value was calculated from the differences between the measured values according to the following formula:

$$\Delta E^* = [(\Delta L^*)^2 + (\Delta a^*)^2 + (\Delta b^*)^2]^{1/2}$$

wherein ΔL* represents the difference between L* values before and after the standing test; Δa* represents the difference between a* values before and after the standing test; and Δb* represents the difference between b* values before and after the standing test.

(17) The viscosity at 25° C. of the paint prepared by the below-mentioned method, was measured at a shear rate of 1.92 sec⁻¹ by using an E-type viscometer (cone plate-type viscometer) "EMD-R" (manufactured by TOKYO KEIKI CO., LTD.).

(18) The dispersibility of the composite particles in the resin composition was evaluated by visually counting the number of undispersed aggregate particles on the surface of the obtained colored resin plate, and classifying the results into the following five ranks. The Rank 5 represents the most excellent dispersibility.

Rank 5: No undispersed aggregate particles were recognized.

Rank 4: 1 to 4 undispersed aggregate particles per 1 cm² were recognized;

Rank 3: 5 to 9 undispersed aggregate particles per 1 cm² were recognized;

Rank 2: 10 to 49 undispersed aggregate particles per 1 cm² were recognized;

Rank 1: Not less than 50 undispersed aggregate particles per 1 cm² were recognized.

Example 1

<Production of Organic and Inorganic Composite Pigments>

20 kg of titanium oxide particles (particle shape: granular shape; average particle diameter: 0.24 μm; BET specific surface area value: 11.6 m²/g; L* value: 96.30; a* value: 0.78; b* value: −1.56; C* value: 1.74; hiding power: 1,490 cm²/g; light resistance (ΔE* value): 6.86) were deaggregated in 150 liters of pure water using a stirrer, and further passed through a "TK Pipeline Homomixer" (manufactured by TOKUSHU KIKA KOGYO CO., LTD.) three times, thereby obtaining a slurry containing the titanium oxide particles.

Successively, the obtained slurry containing the titanium oxide particles was passed through a transverse-type sand grinder (tradename: "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry, which remained on a sieve of 32.5 meshes (mesh size: 44 μm) was 0%. The slurry was filtered and washed with water, thereby obtaining a wet cake composed of the titanium oxide particles. The obtained wet cake composed of the titanium oxide particles was dried at 120° C. 10.0 kg of the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly deaggregating the particles.

Then, 100 g of methyltriethoxysilane "TSL8123" (tradename, produced by GE TOSHIBA SILICONE CO., LTD.) was mixed and diluted with 200 ml of ethanol to obtain a solution of methyltriethoxysilane. The methyltriethoxysilane solution was added to the deaggregated titanium oxide particles while operating the edge runner. The titanium oxide particles were continuously mixed and stirred at a linear load of 588 N/cm (60 Kg/cm) and a stirring speed of 22 rpm for 30 minutes.

Next, 5 kg of organic pigments B-1 (kind: Pigment Blue (phthalocyanine-based pigments); particle shape: granular shape; average particle diameter: 0.06 μm; BET specific surface area: 71.6 m$^2$/g; hiding power: 630 cm$^2$/g; L* value: 17.70; a* value: 9.72; b* value: −23.44; light resistance (ΔE* value): 10.84) were added to the titanium oxide particles coated with methyltriethoxysilane for 10 minutes while operating the edge runner. Further, the obtained particles were continuously mixed and stirred at a linear load of 392 N/cm (40 Kg/cm) and a stirring speed of 22 rpm for 20 minutes to form an organic pigment B-1 coat on the coating layer composed of methyltriethoxysilane.

Then, 50 g of a benzotriazole-based ultraviolet light-absorbing agent "TINUVIN 571" (tradename, produced by CIBA-GEIGY CO., LTD.) was added to the above-obtained composite particles for 10 minutes while operating the edge runner. Further, the resultant mixture was continuously mixed and stirred at a linear load of 392 N/cm (40 Kg/cm) and a stirring speed of 22 rpm for 30 minutes to adhere the benzotriazole-based ultraviolet light-absorbing agent onto the organic pigment B-1 coat. The thus obtained particles were heat-treated at 80° C. for 60 minutes using a dryer, thereby obtaining organic and inorganic composite pigments.

The thus obtained organic and inorganic composite pigments were granular particles having an average particle diameter of 0.24 μm, and had a BET specific surface area value of 12.8 m$^2$/g; a L* value of 30.58; an a* value of 6.95; a b* value of −19.33; a hiding power of 1,430 cm$^2$/g; a light resistance (ΔE* value) of 1.30; and a degree of desorption of organic pigments of the rank 5. In addition, it was confirmed that the amount of a coating composed of organosilane compound produced from methyl triethoxysilane was 0.15% by weight (calculated as Si); the amount of the organic pigment B-1 coat formed on the coating composed of organosilane compound produced from methyl triethoxysilane is 22.18% by weight (calculated as C; corresponding to 50 parts by weight based on 100 parts by weight of the titanium oxide particles); and the amount of the ultraviolet light-absorbing agent adhered was 0.99% by weight based on the weight of the organic pigments adhered.

As a result of observing the micrograph, since no organic pigments B-1 were recognized from the micrograph, it was confirmed that almost whole amount of the organic pigments B-1 used contributed to the formation of the organic pigment coat on the coating composed of the organosilane compound produced from methyl triethoxysilane.

Example 2

<Production of Solvent-based Paint Containing Organic and Inorganic Composite Pigments>

10 g of the organic and inorganic composite pigments produced in Example 1, were blended with an amino alkyd resin and a thinner at the following weight ratio, and charged into a 140-ml glass bottle together with 90 g of 3 mmφ glass beads. Next, the obtained mixture was mixed and dispersed for 90 minutes by a paint shaker, thereby preparing a mill base.

| Composition of mill base: | |
|---|---|
| Organic and inorganic composite pigments | 12.2 parts by weight |
| Aminoalkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the organic and inorganic composite pigments.

| Composition of solvent-based paint: | |
|---|---|
| Mill base | 39.0 parts by weight |
| Aminoalkyd resin (AMILAC No. 1026, produced by KANSAI PAINT CO., LTD.) | 61.0 parts by weight |

The thus obtained solvent-based paint exhibited a viscosity of 933 cP and a storage stability (ΔE* value) of 1.39.

Next, the thus prepared solvent-based paint was applied onto a cold-rolled steel plate (0.8 mm×70 mm×150 mm; JIS G-3141) and dried to form a coating film having a thickness of 150 μm. The thus dried coating film showed a gloss of 93% and a light resistance (ΔE* value) of 1.33. As to the hue of the coating film, the L* value thereof was 32.64, the a* value thereof was 7.01 and the b* value thereof was −19.20.

Example 3

<Production of Water-based Saint Containing Organic and Inorganic Composite Pigments>

7.62 g of the organic and inorganic composite pigments obtained in Example 1, were blended with a water-soluble alkyd resin and the like at the following weight ratio, and charged into a 140-ml glass bottle together with 90 g of 3 mmφ glass beads. Next, the obtained mixture was mixed and dispersed for 90 minutes by a paint shaker, thereby preparing a mill base.

| Composition of mill base: | |
|---|---|
| Organic and inorganic composite pigments | 12.4 parts by weight |
| Water-soluble alkyd resin (tradename: "S-118", produced by DAI-NIPPON INK KAGAKU KOGYO CO., LTD.) | 9.0 parts by weight |

-continued

Composition of mill base:

| | |
|---|---|
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-based paint.

Composition of water-based paint:

| | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 1,164 cP and a storage stability (ABE* value) of 0.87.

Next, the thus prepared water-based paint was applied onto a cold-rolled steel plate (0.8 mm×70 mm×150 mm; JIS G-3141) and dried to form a coating film having a thickness of 150 μm. The obtained coating film showed a gloss of 90% and a light resistance (ΔE* value) of 1.32. As to the hue of the coating film, the L* value thereof was 33.01, the a* value thereof was 7.04 and the b* value thereof was −19.25.

Example 4
<Production of Resin Composition>

2.5 g of the organic and inorganic composite pigments obtained in Example 1, and 47.5 g of polyvinyl chloride resin particles "103EP8D" (produced by NIPPON ZEON CO., LTD.) were weighed and charged into a 100-ml beaker made of resins, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98,000 kPa (1 ton/cm²) thereto, thereby obtaining a colored resin plate having a thickness of 1 mm. The thus-produced colored resin plate had a dispersibility of rank 5 and a light resistance (ΔE* value) of 1.35. As to the hue of the colored resin plate, the L* value thereof was 33.06, the a* value thereof was 7.05 and the b* value thereof was −19.11.

Core Particles 1 to 5:
White inorganic particles as core particles 1 to 5 having properties shown in Table 1 were prepared.

Core Particles 6:
A slurry containing titanium oxide particles was obtained by dispersing 20 kg of titanium oxide particles (core particles 1) in 150 liters of water. The pH value of the thus obtained re-dispersed slurry containing the titanium oxide particles was adjusted to 10.5 by using an aqueous sodium hydroxide solution, and then the concentration of the slurry was adjusted to 98 g/liter by adding water thereto. After 150 liters of the slurry was heated to 60° C., 5,444 ml of a 1.0 mol/liter sodium aluminate solution (corresponding to 1.0% by weight (calculated as Al) based on the weight of the titanium oxide particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the titanium oxide particles coated with hydroxides of aluminum.

The essential production conditions are shown in Table 2, and various properties of the obtained surface-treated titanium oxide particles are shown in Table 3.

Core Particles 7 to 10:
The same procedure as defined for the production of the above core particles 6, was conducted except that the core particles 2 to 5 were respectively used instead of the core particles 1, and kinds and amounts of coating materials were changed variously, thereby obtaining white inorganic particles coated with the respective coating materials.

The essential production conditions are shown in Table 2, and various properties of the obtained surface-treated white inorganic particles are shown in Table 3.

Meanwhile, in Tables, "A" and "S" as described in "kind of coating material used in surface-treating step" represent hydroxides of aluminum and oxides of silicon, respectively.

Organic Pigments:
Organic pigments having properties as shown in Table 4 were prepared.

Examples 5 to 18, Comparative Example 1 and Reference Examples 1 to 4

The same procedure as defined in Example 1 was conducted except that addition timing, kinds and amounts of ultraviolet light-absorbing agents added in the ultraviolet light-absorbing agent-applying step, linear load and treating time for edge runner treatment used in the ultraviolet light-absorbing agent-applying step, kinds and amounts of additives added in the coating step with alkoxysilanes or polysiloxanes, linear load and treating time for edge runner treatment used in the coating step with alkoxysilanes or polysiloxanes, kinds and amounts of organic pigments adhered in organic pigment-adhering step, and linear load and treating time for edge runner treatment used in the organic pigment-adhering step, were changed variously, thereby obtaining organic and inorganic composite pigments.

The essential production conditions are shown in Tables 5 to 8, and various properties of the obtained organic and inorganic composite pigments are shown in Tables 9 and 10.

Meanwhile, in Tables 5 and 6, the numerals shown in "Addition timing" of "Ultraviolet light-absorbing agent" respectively represent the following addition methods:

1: After mixing the core particles with the ultraviolet light-absorbing agent, the obtained particles were successively subjected to the coating treatment with alkoxysilanes or polysiloxanes and the coating/adhesion treatment with organic pigments.

2: The ultraviolet light-absorbing agent, and alkoxysilanes or polysiloxanes were simultaneously added to the core particles, and then the obtained particles were subjected to the coating/adhesion treatment with organic pigments.

3: After coating the core particles with alkoxysilanes or polysiloxanes, the obtained particles were adhered with the ultraviolet light-absorbing agent, and then subjected to the coating/adhesion treatment with organic pigments.

4: After coating the core particles with alkoxysilanes or polysiloxanes, the obtained particles were subjected to the simultaneous coating/adhesion treatment with both the ultraviolet light-absorbing agent and organic pigments.

5: After successively subjecting the core particles to the coating treatment with alkoxysilanes or polysiloxanes and the coating/adhesion treatment with organic pigments, the obtained particles were adhered with the ultraviolet light-absorbing agent.

Also, in Tables 5 and 6, the "Amount applied[*1]" indicates the amount (wt. %) of the ultraviolet light-absorbing agent applied based on the weight of the organic pigments adhered.

Examples 19 to 32, Comparative Example 2 and Reference Examples 5 to 8

The same procedure as defined in Example 2 was conducted except that kinds of organic and inorganic composite pigments were changed variously, thereby obtaining paints.

Various properties of the obtained paints and various properties of coating films produced therefrom are shown in Tables 11 and 12.

Examples 33 to 46, Comparative Example 3 and Reference Examples 9 to 12

The same procedure as defined in Example 3 was conducted except that kinds of organic and inorganic composite pigments were changed variously, thereby obtaining water-based paints.

Various properties of the obtained water-based paints and various properties of coating films produced therefrom are shown in Tables 13 and 14.

Examples 47 to 60, Comparative Example 4 and Reference Examples 13 to 16

The same procedure as defined in Example 4 was conducted except that kinds of organic and inorganic composite pigments were changed variously, thereby obtaining resin compositions.

The essential production conditions and various properties of the obtained resin compositions are shown in Tables 15 and 16.

TABLE 1

| Kind of core particles | Properties of white inorganic particles | | | |
|---|---|---|---|---|
| | Kind | Shape | Average particle diameter (μm) | BET specific surface area value (m²/g) |
| Core particles 1 | Titanium oxide | Granular | 0.25 | 10.3 |
| Core particles 2 | Zinc oxide | Granular | 0.18 | 18.3 |
| Core particles 3 | Precipitated barium sulfate | Granular | 0.06 | 21.3 |
| Core particles 4 | Silica | Granular | 0.05 | 168.4 |
| Core particles 5 | Pearl mica | Plate-shaped | 8.23 | 5.8 |

| Kind of core particles | Properties of white inorganic particles | | | |
|---|---|---|---|---|
| | Hue | | | |
| | L* value (–) | a* value (–) | b* value (–) | c* value (–) |
| Core particles 1 | 96.63 | –0.58 | –0.69 | 0.90 |
| Core particles 2 | 90.27 | –2.14 | 4.13 | 4.65 |
| Core particles 3 | 91.62 | 0.31 | 0.98 | 1.03 |
| Core particles 4 | 95.14 | 0.39 | 0.20 | 0.44 |
| Core particles 5 | 87.71 | 1.65 | 2.12 | 2.69 |

| Kind of core particles | Properties of white inorganic particles | |
|---|---|---|
| | Hiding power (cm²/g) | Light resistance (ΔE* value) (–) |
| Core particles 1 | 1,560 | 6.15 |
| Core particles 2 | 730 | 5.86 |
| Core particles 3 | 13 | 5.32 |
| Core particles 4 | 10 | 4.66 |
| Core particles 5 | 280 | 9.11 |

TABLE 2

| Core particles | Kind of core particles | Surface-treating step Additives | | |
|---|---|---|---|---|
| | | Kind | Calculated as | Amount (wt. %) |
| Core particles 6 | Core particles 1 | Sodium aluminate | Al | 1.0 |
| Core particles 7 | Core particles 2 | Sodium aluminate | Al | 2.0 |
| Core particles 8 | Core particles 3 | Sodium aluminate | Al | 2.0 |
| | | Water glass #3 | SiO₂ | 0.50 |
| Core particles 9 | Core particles 4 | Aluminum sulfate | Al | 5.0 |
| Core particles 10 | Core particles 5 | Aluminum sulfate | Al | 0.5 |

| Core particles | Surface-treating step Coating material | | |
|---|---|---|---|
| | Kind | Calculated as | Amount (wt. %) |
| Core particles 6 | A | Al | 0.98 |
| Core particles 7 | A | Al | 1.96 |
| Core particles 8 | A | Al | 1.93 |
| | S | SiO₂ | 0.47 |

TABLE 2-continued

| | | | |
|---|---|---|---|
| Core particles 9 | A | Al | 4.76 |
| Core particles 10 | A | Al | 0.50 |

TABLE 3

Properties of surface-treated white inorganic particles

| Kind of core particles | Average particle diameter (μm) | BET specific surface area value (m²/g) |
|---|---|---|
| Core particles 6 | 0.25 | 12.1 |
| Core particles 7 | 0.18 | 18.6 |
| Core particles 8 | 0.06 | 21.9 |
| Core particles 9 | 0.05 | 129.1 |
| Core particles 10 | 8.23 | 5.6 |

Properties of surface-treated white inorganic particles Hue

| Kind of core particles | L* value (–) | a* value (–) | b* value (–) | C* value (–) |
|---|---|---|---|---|
| Core particles 6 | 96.49 | −0.46 | −0.54 | 0.71 |
| Core particles 7 | 89.69 | −1.86 | 5.07 | 5.40 |
| Core particles 8 | 91.03 | 0.44 | 0.81 | 0.92 |
| Core particles 9 | 94.61 | 0.20 | 0.11 | 0.23 |
| Core particles 10 | 87.91 | 1.46 | 1.80 | 2.32 |

Properties of surface-treated white inorganic particles

| Kind of core particles | Hiding power (cm²/g) | Light resistance (ΔE* value) (–) |
|---|---|---|
| Core particles 6 | 1,480 | 5.86 |
| Core particles 7 | 710 | 5.12 |
| Core particles 8 | 14 | 5.92 |
| Core particles 9 | 11 | 4.16 |
| Core particles 10 | 260 | 8.71 |

TABLE 4

Properties of organic pigments

| Organic pigments | Kind | Shape | Average particle diameter (μm) |
|---|---|---|---|
| Organic pigments B-1 | Pigment Blue (phthalocyanine-based pigments) | Granular | 0.06 |
| Organic pigments B-2 | Pigment Blue (phthalocyanine-based pigments) | Granular | 0.08 |
| Organic pigments R-1 | Pigment Red (quinacridone-based pigments) | Granular | 0.58 |
| Organic pigments R-2 | Pigment Red (quinacridone-based pigments) | Granular | 0.50 |
| Organic pigments Y-1 | Pigment Yellow (azo-based pigments) | Granular | 0.73 |
| Organic pigments Y-2 | Pigment Yellow (azo-based pigments) | Granular | 0.65 |

Properties of Organic pigments

| Organic pigments | BET specific surface area value (m²/g) | Hiding power (cm²/g) |
|---|---|---|
| Organic pigments B-1 | 71.6 | 630 |
| Organic pigments B-2 | 56.3 | 272 |
| Organic pigments R-1 | 19.3 | 480 |
| Organic pigments R-2 | 21.6 | 220 |
| Organic pigments Y-1 | 10.5 | 320 |
| Organic pigments Y-2 | 12.3 | 280 |

Properties of organic pigments

| Organic pigments | L* value (–) | a* value (–) | b* value (–) | Light resistance (ΔE* value) (–) |
|---|---|---|---|---|
| Organic pigments B-1 | 17.70 | 9.72 | −23.44 | 10.84 |
| Organic pigments B-2 | 17.32 | 11.60 | −26.53 | 10.21 |
| Organic pigments R-1 | 36.99 | 51.88 | 20.57 | 14.65 |
| Organic pigments R-2 | 28.30 | 58.26 | 20.61 | 16.36 |
| Organic pigments Y-1 | 66.80 | 0.78 | 70.92 | 17.33 |
| Organic pigments Y-2 | 68.58 | 0.65 | 72.86 | 19.65 |

TABLE 5

Production of organic and inorganic composite pigments
Step of adding ultraviolet light-absorbing agent

| Examples | Kind of core particles | Addition timing of ultraviolet light-absorbing agent | Ultraviolet light-absorbing agent Kind | Amount added (wt. part) |
|---|---|---|---|---|
| Example 5 | Core particles 1 | 1 | TINUVIN571 | 1.0 |
| Example 6 | Core particles 1 | 2 | TINUVIN571 | 1.0 |
| Example 7 | Core particles 1 | 3 | TINUVIN571 | 1.0 |
| Example 8 | Core particles 1 | 4 | TINUVIN571 | 1.0 |

TABLE 5-continued

Production of organic and inorganic composite pigments
Step of adding ultraviolet light-absorbing agent

| Examples | Kind of core particles | Addition timing of ultraviolet light-absorbing agent | Kind | Amount added*1 (wt. part) |
|---|---|---|---|---|
| Example 9 | Core particles 1 | 5 | TINUVIN571 | 1.0 |
| Example 10 | Core particles 2 | 2 | TINUVIN571 | 0.5 |
| Example 11 | Core particles 3 | 3 | TINUVIN213 | 0.5 |
| Example 12 | Core particles 4 | 4 | TINUVIN571 | 1.0 |
| Example 13 | Core particles 5 | 5 | TINUVIN213 | 2.0 |
| Example 14 | Core particles 6 | 1 | TINUVIN571 | 0.2 |
| Example 15 | Core particles 7 | 2 | TINUVIN571 | 0.5 |
| Example 16 | Core particles 8 | 3 | TINUVIN571 | 1.0 |
| Example 17 | Core particles 9 | 4 | TINUVIN571 | 20.0 |
| Example 18 | Core particles 10 | 5 | TINUVIN571 | 0.5 |

Production of organic and inorganic composite pigments
Step of adding ultraviolet light-absorbing agent

| | Edge runner treatment | | Amount added*1 |
|---|---|---|---|
| Examples | Linear load (N/cm) | Linear load (Kg/cm) | Time (min) | (wt. %) |
| Example 5 | 294 | 30 | 20 | 2.40 |
| Example 6 | 294 | 30 | 20 | 2.41 |
| Example 7 | 294 | 30 | 20 | 2.40 |
| Example 8 | 294 | 30 | 20 | 2.41 |
| Example 9 | 294 | 30 | 20 | 2.42 |
| Example 10 | 588 | 60 | 20 | 2.43 |
| Example 11 | 588 | 60 | 20 | 0.80 |
| Example 12 | 294 | 30 | 20 | 2.39 |
| Example 13 | 441 | 45 | 20 | 3.80 |
| Example 14 | 588 | 60 | 20 | 0.20 |
| Example 15 | 294 | 30 | 20 | 0.25 |
| Example 16 | 441 | 45 | 20 | 0.98 |
| Example 17 | 588 | 60 | 20 | 14.20 |
| Example 18 | 294 | 30 | 20 | 0.33 |

Production of organic and inorganic composite pigments
Coating step with alkoxysilanes or polysiloxanes
Additives

| Examples | Kind | Amount added (wt. part) |
|---|---|---|
| Example 5 | Methyl triethoxysilane | 2.0 |
| Example 6 | Phenyl triethoxysilane | 1.0 |
| Example 7 | Methyl trimethoxysilane | 2.0 |
| Example 8 | Dimethyl dimethoxysilane | 1.0 |
| Example 9 | Phenyl triethoxysilane | 2.0 |
| Example 10 | Methyl hydrogen polysiloxane | 4.0 |
| Example 11 | Methyl triethoxysilane | 1.0 |
| Example 12 | Methyl triethoxysilane | 2.0 |
| Example 13 | Phenyl triethoxysilane | 0.5 |
| Example 14 | Methyl hydrogen polysiloxane | 5.0 |
| Example 15 | Methyl triethoxysilane | 3.0 |
| Example 16 | Methyl trimethoxysilane | 2.0 |
| Example 17 | Phenyl triethoxysilane | 1.0 |
| Example 18 | Methyl hydrogen polysiloxane | 2.0 |

Production of organic and inorganic composite pigments
Coating step with alkoxysilanes or polysiloxanes

| | Edge runner treatment | | Coating amount (calculated as C |
|---|---|---|---|
| Examples | Linear load (N/cm) | Linear load (Kg/cm) | Time (min) | (wt. %) |
| Example 5 | 588 | 60 | 30 | 0.13 |
| Example 6 | 588 | 60 | 30 | 0.35 |
| Example 7 | 588 | 60 | 20 | 0.17 |
| Example 8 | 588 | 60 | 30 | 0.19 |
| Example 9 | 588 | 60 | 30 | 0.71 |
| Example 10 | 294 | 30 | 20 | 1.06 |
| Example 11 | 294 | 30 | 30 | 0.07 |
| Example 12 | 441 | 45 | 40 | 0.13 |
| Example 13 | 441 | 45 | 60 | 0.18 |
| Example 14 | 735 | 75 | 30 | 1.36 |
| Example 15 | 588 | 60 | 20 | 0.19 |
| Example 16 | 441 | 45 | 30 | 0.17 |
| Example 17 | 294 | 30 | 25 | 0.36 |
| Example 18 | 588 | 60 | 30 | 0.55 |

TABLE 6

Production of organic and inorganic composite pigments
Step of adding ultraviolet light-absorbing agent

| Comparative Example and Reference Examples | Kind of core particles | Addition timing of ultraviolet light-absorbing agent | Ultraviolet light-absorbing agent Kind | Amount added (wt. part) |
|---|---|---|---|---|
| Comparative Example 1 | Core particles 1 | 5 | TINUVIN571 | 1.0 |
| Reference Example 1 | Core particles 1 | — | — | — |
| Reference Example 2 | Core particles 1 | — | — | — |
| Reference Example 3 | Core particles 1 | — | — | — |
| Reference Example 4 | Core particles 1 | 3 | TINUVIN571 | 0.01 |

Production of organic and inorganic composite pigments
Step of adding ultraviolet light-absorbing agent

| Comparative Example and Reference Examples | Edge runner treatment | | Amount added |
|---|---|---|---|
| | Linear load (N/cm) | Linear load (Kg/cm) | Time (min) | (wt. %) |
| Comparative Example 1 | 294 | 30 | 20 | 2.41 |
| Reference Example 1 | — | — | — | — |

TABLE 6-continued

| Comparative Example and Reference Examples | | | |
|---|---|---|---|
| Reference Example 2 | — | — | — | — |
| Reference Example 3 | — | — | — | — |
| Reference Example 4 | 294 | 30 | 20 | 0.02 |

Production of organic and inorganic composite pigments
Coating step with alkoxysilanes or polysiloxanes
Additives

| Comparative Example and Reference Examples | Kind | Amount added (wt. part) |
|---|---|---|
| Comparative Example 1 | — | — |
| Reference Example 1 | Methyl triethoxysilane | 1.0 |
| Reference Example 2 | Phenyl triethoxysilane | 1.0 |
| Reference Example 3 | Methyl triethoxysilane | 1.0 |
| Reference Example 4 | Phenyl triethoxysilane | 1.0 |

Production of organic and inorganic composite pigments
Coating step with alkoxysilanes or polysiloxanes

| Comparative Example and Reference Examples | Edge runner treatment | | | Coating amount (calculated as C (wt. %) |
|---|---|---|---|---|
| | Linear load (N/cm) | (Kg/cm) | Time (min) | |
| Comparative Example 1 | — | — | — | — |
| Reference Example 1 | 588 | 60 | 30 | 0.07 |
| Reference Example 2 | 588 | 60 | 20 | 0.07 |
| Reference Example 3 | 588 | 60 | 30 | 0.07 |
| Reference Example 4 | 588 | 60 | 30 | 0.07 |

TABLE 7

Production of organic and inorganic composite pigments
Adhesion step with organic pigments
Organic pigments

| Examples | Kind | Amount added (wt. part) | Kind | Amount added (wt. part) |
|---|---|---|---|---|
| Example 5 | Y-1 | 40.0 | — | — |
| Example 6 | Y-1 | 40.0 | — | — |
| Example 7 | Y-1 | 40.0 | — | — |
| Example 8 | Y-1 | 40.0 | — | — |
| Example 9 | Y-1 | 40.0 | — | — |
| Example 10 | B-1 | 20.0 | — | — |
| Example 11 | B-2 | 60.0 | — | — |
| Example 12 | R-1 | 40.0 | — | — |
| Example 13 | R-2 | 50.0 | — | — |
| Example 14 | Y-1 | 100.0 | — | — |
| Example 15 | Y-2 | 200.0 | — | — |

TABLE 7-continued

| Example 16 | B-1 | 20.0 | Y-1 | 80.0 |
| Example 17 | R-1 | 20.0 | Y-1 | 100.0 |
| Example 18 | Y-1 | 100.0 | B-1 | 50.0 |

Production of organic and inorganic composite pigments
Adhesion step with organic pigment

| Examples | Edge runner treatment | | | Amount adhered (calculated as C) (wt. %) |
|---|---|---|---|---|
| | Linear load (N/cm) | (Kg/cm) | Time (min) | |
| Example 5 | 588 | 60 | 30 | 15.13 |
| Example 6 | 588 | 60 | 30 | 15.06 |
| Example 7 | 588 | 60 | 30 | 15.11 |
| Example 8 | 588 | 60 | 30 | 15.19 |
| Example 9 | 588 | 60 | 30 | 15.20 |
| Example 10 | 441 | 45 | 20 | 11.01 |
| Example 11 | 441 | 45 | 40 | 24.84 |
| Example 12 | 294 | 30 | 60 | 21.75 |
| Example 13 | 294 | 30 | 60 | 25.52 |
| Example 14 | 588 | 60 | 60 | 26.67 |
| Example 15 | 588 | 60 | 120 | 35.30 |
| Example 16 | 735 | 75 | 90 | — |
| Example 17 | 735 | 75 | 120 | — |
| Example 18 | 735 | 75 | 120 | — |

TABLE 8

Production of organic and inorganic composite pigments
Adhesion step with organic pigments
Organic pigments

| Comparative Example and Reference Examples | Kind | Amount added (wt. part) | Kind | Amount added (wt. part) |
|---|---|---|---|---|
| Comparative Example 1 | Y-1 | 40.0 | — | — |
| Reference Example 1 | B-1 | 40.0 | — | — |
| Reference Example 2 | R-1 | 40.0 | — | — |
| Reference Example 3 | Y-1 | 40.0 | — | — |
| Reference Example 4 | Y-1 | 40.0 | — | — |

Production of organic and inorganic composite pigments
Adhesion step with organic pigment

| Comparative Example and Reference Examples | Edge runner treatment | | | Amount adhered (calculated as C) (wt. %) |
|---|---|---|---|---|
| | Linear load (N/cm) | (Kg/cm) | Time (min) | |
| Comparative Example 1 | 588 | 60 | 30 | 15.08 |
| Reference Example 1 | 588 | 60 | 30 | 18.89 |
| Reference Example 2 | 588 | 60 | 30 | 21.80 |
| Reference Example 3 | 588 | 60 | 20 | 15.12 |
| Reference Example 4 | 588 | 60 | 30 | 15.09 |

TABLE 9

Properties of organic and inorganic composite pigments

| Examples | Average particle diameter (μm) | BET specific surface area value (m²/g) | L* value (-) | a* value (-) | b* value (-) | Tinting strength (%) | Hiding power (cm²/g) | Light resistance (ΔE* value) (-) | Degree of desorption of organic pigments (-) |
|---|---|---|---|---|---|---|---|---|---|
| Example 5 | 0.26 | 9.6 | 76.11 | 1.23 | 63.32 | 191 | 1,460 | 1.31 | 5 |
| Example 6 | 0.26 | 9.1 | 76.96 | 1.24 | 63.52 | 191 | 1,480 | 1.30 | 5 |
| Example 7 | 0.26 | 9.6 | 77.32 | 1.26 | 63.86 | 193 | 1,450 | 1.25 | 5 |
| Example 8 | 0.26 | 9.3 | 76.65 | 1.26 | 63.16 | 192 | 1,460 | 1.24 | 5 |
| Example 9 | 0.26 | 9.6 | 76.38 | 1.33 | 63.29 | 193 | 1,450 | 1.21 | 5 |
| Example 10 | 0.18 | 19.3 | 31.62 | 7.16 | -17.62 | 162 | 930 | 1.18 | 5 |
| Example 11 | 0.07 | 23.4 | 33.13 | 9.13 | -19.36 | 201 | 290 | 1.46 | 5 |
| Example 12 | 0.05 | 141.3 | 56.32 | 45.32 | 11.26 | 194 | 70 | 1.28 | 5 |
| Example 13 | 8.23 | 7.2 | 53.21 | 41.32 | 13.16 | 198 | 340 | 1.15 | 5 |
| Example 14 | 0.26 | 10.6 | 78.11 | 1.63 | 68.96 | 210 | 1,320 | 1.87 | 5 |
| Example 15 | 0.18 | 12.8 | 76.34 | 1.23 | 70.16 | 223 | 860 | 1.84 | 4 |
| Example 16 | 0.07 | 16.8 | 35.31 | -2.12 | -12.38 | 212 | 480 | 1.66 | 4 |
| Example 17 | 0.06 | 101.6 | 41.32 | 21.32 | 26.32 | 219 | 520 | 0.60 | 4 |
| Example 18 | 8.24 | 3.8 | 33.65 | -6.12 | -21.26 | 221 | 460 | 1.73 | 4 |

TABLE 10

Properties of organic and inorganic composite pigments

| Comparative Example and Reference Examples | Average particle diameter (μm) | BET specific surface area value (m²/g) | L* value (-) | a* value (-) | b* value (-) | Tinting strength (%) | Hiding power (cm²/g) | Light resistance (ΔE* value) (-) | Degree of desorption of organic pigments (-) |
|---|---|---|---|---|---|---|---|---|---|
| Comparative Example 1 | 0.26 | 10.4 | 74.89 | 1.11 | 60.58 | 106 | 1,320 | 3.82 | 1 |
| Reference Example 1 | 0.26 | 9.8 | 35.13 | 6.15 | -18.21 | 192 | 1,380 | 3.15 | 5 |
| Reference Example 2 | 0.26 | 9.6 | 58.33 | 47.53 | 12.62 | 192 | 1,400 | 3.22 | 5 |
| Reference Example 3 | 0.26 | 9.6 | 76.32 | 1.18 | 63.00 | 190 | 1,430 | 3.48 | 5 |
| Reference Example 4 | 0.26 | 10.0 | 76.16 | 1.19 | 64.15 | 191 | 1,420 | 3.09 | 5 |

TABLE 11

| | Production of paint | Properties of paint | | | | | | | |
|---|---|---|---|---|---|---|---|---|---|
| Examples | Kind of organic and inorganic composite pigments | Viscosity (cP) | Storage stability (-) | 60° gloss (%) | Hue | | | Light resistance (ΔE* value) (-) | Transparency (linear absorption) (μm⁻¹) |
| | | | | | L* value (-) | a* value (-) | b* value (-) | | |
| Example 19 | Example 5 | 968 | 0.90 | 93 | 76.49 | 1.28 | 63.30 | 1.42 | — |
| Example 20 | Example 6 | 832 | 0.88 | 92 | 77.34 | 1.27 | 63.48 | 1.40 | — |
| Example 21 | Example 7 | 736 | 0.91 | 95 | 77.88 | 1.30 | 63.77 | 1.35 | — |
| Example 22 | Example 8 | 683 | 0.92 | 91 | 77.01 | 1.30 | 63.24 | 1.34 | — |
| Example 23 | Example 9 | 832 | 0.94 | 92 | 77.21 | 1.35 | 63.37 | 1.30 | — |
| Example 24 | Example 10 | 652 | 0.91 | 93 | 33.06 | 7.19 | -17.58 | 1.28 | 0.211 |
| Example 25 | Example 11 | 1,152 | 0.91 | 91 | 33.79 | 9.22 | -19.30 | 1.55 | 0.066 |
| Example 26 | Example 12 | 2,560 | 0.95 | 93 | 58.41 | 45.38 | 11.30 | 1.36 | 0.063 |
| Example 27 | Example 13 | 983 | 0.91 | 95 | 54.13 | 41.39 | 13.21 | 1.25 | 0.096 |
| Example 28 | Example 14 | 962 | 1.01 | 93 | 79.25 | 1.69 | 69.01 | 1.99 | — |
| Example 29 | Example 15 | 765 | 1.06 | 94 | 77.09 | 1.27 | 70.11 | 1.95 | 0.183 |
| Example 30 | Example 16 | 831 | 1.04 | 92 | 36.18 | -2.10 | -12.30 | 1.74 | 0.061 |
| Example 31 | Example 17 | 1,260 | 1.05 | 96 | 42.33 | 21.28 | 26.35 | 0.88 | 0.052 |
| Example 32 | Example 18 | 963 | 1.05 | 96 | 34.37 | -6.08 | -21.20 | 1.82 | 0.084 |

TABLE 12

| Comparative Example and Reference Examples | Production of paint Kind of organic and inorganic composite pigments | Properties of paint | | | | | | | |
|---|---|---|---|---|---|---|---|---|---|
| | | Viscosity (cP) | Storage stability (-) | 60° gloss (%) | L* value (-) | Hue a* value (-) | b* value (-) | Light resistance (ΔE* value) (-) | Transparency (linear absorption) ($\mu m^{-1}$) |
| Comparative Example 2 | Comparative Example 1 | 10.331 | 2.13 | 62 | 75.43 | 1.06 | 60.48 | 3.99 | — |
| Reference Example 5 | Reference Example 1 | 832 | 0.92 | 88 | 36.11 | 6.18 | −18.25 | 3.26 | — |
| Reference Example 6 | Reference Example 2 | 836 | 0.90 | 89 | 59.46 | 47.50 | 12.58 | 3.33 | — |
| Reference Example 7 | Reference Example 3 | 916 | 0.91 | 91 | 77.13 | 1.15 | 62.95 | 3.59 | — |
| Reference Example 8 | Reference Example 4 | 913 | 0.93 | 90 | 77.00 | 1.21 | 63.88 | 3.20 | — |

TABLE 13

| Examples | Production of water-based paint Kind of organic and inorganic composite pigments | Properties of paint | | | | | | | |
|---|---|---|---|---|---|---|---|---|---|
| | | Viscosity (cP) | Storage stability (-) | 60° gloss (%) | L* value (-) | Hue a* value (-) | b* value (-) | Light resistance (ΔE* value) (-) | Transparency (linear absorption) ($\mu m^{-1}$) |
| Example 33 | Example 5 | 1,232 | 0.88 | 93 | 76.40 | 1.27 | 63.25 | 1.40 | — |
| Example 34 | Example 6 | 1,412 | 0.87 | 92 | 77.31 | 1.26 | 63.45 | 1.38 | — |
| Example 35 | Example 7 | 1,321 | 0.90 | 94 | 77.85 | 1.30 | 63.70 | 1.34 | — |
| Example 36 | Example 8 | 1,128 | 0.90 | 93 | 76.98 | 1.34 | 63.28 | 1.33 | — |
| Example 37 | Example 9 | 1,126 | 0.91 | 95 | 77.08 | 1.33 | 63.39 | 1.29 | — |
| Example 38 | Example 10 | 1,231 | 0.87 | 94 | 33.16 | 7.18 | −17.55 | 1.27 | 0.261 |
| Example 39 | Example 11 | 1,863 | 0.88 | 91 | 33.85 | 9.24 | −19.24 | 1.53 | 0.091 |
| Example 40 | Example 12 | 3,368 | 0.92 | 93 | 58.34 | 45.33 | 11.28 | 1.34 | 0.083 |
| Example 41 | Example 13 | 1,121 | 0.88 | 94 | 54.10 | 41.34 | 13.20 | 1.24 | 0.103 |
| Example 42 | Example 14 | 1,260 | 0.97 | 96 | 79.21 | 1.60 | 69.05 | 1.89 | — |
| Example 43 | Example 15 | 1,256 | 0.99 | 97 | 77.00 | 1.25 | 70.16 | 1.94 | 0.196 |
| Example 44 | Example 16 | 1,384 | 1.02 | 98 | 36.15 | −2.08 | −12.25 | 1.73 | 0.079 |
| Example 45 | Example 17 | 2,150 | 1.03 | 97 | 42.31 | 21.20 | 26.40 | 1.87 | 0.069 |
| Example 46 | Example 18 | 1,260 | 1.01 | 95 | 34.30 | −6.00 | −21.18 | 1.81 | 0.100 |

TABLE 14

| Comparative Example and Reference Examples | Production of water-based paint Kind of organic and inorganic composite pigments | Properties of paint | | | | | | | |
|---|---|---|---|---|---|---|---|---|---|
| | | Viscosity (cP) | Storage stability (-) | 60° gloss (%) | L* value (-) | Hue a* value (-) | b* value (-) | Light resistance (ΔE* value) (-) | Transparency (linear absorption) ($\mu m^{-1}$) |
| Comparative Example 3 | Comparative Example 1 | 20,018 | 2.11 | 60 | 75.38 | 1.05 | 60.49 | 3.95 | — |
| Reference Example 9 | Reference Example 1 | 1,121 | 0.90 | 87 | 36.09 | 6.17 | −18.20 | 3.25 | — |
| Reference Example 10 | Reference Example 2 | 1,024 | 0.88 | 88 | 59.40 | 47.48 | 12.57 | 3.31 | — |
| Reference Example 11 | Reference Example 3 | 1,128 | 0.89 | 86 | 77.08 | 1.12 | 62.99 | 3.58 | — |
| Reference Example 12 | Reference Example 4 | 1,251 | 0.90 | 89 | 76.87 | 1.20 | 63.89 | 3.19 | — |

TABLE 15

| Examples | Production of resin composition - Kind of organic and inorganic composite pigments | Dispersing condition (-) | Properties of resin composition - Hue L* value (-) | a* value (-) | b* value (-) | Light resistance (ΔE* value) (-) | Transparency (linear absorption) (μm⁻¹) |
|---|---|---|---|---|---|---|---|
| Example 47 | Example 5 | 5 | 77.12 | 1.28 | 63.24 | 1.45 | — |
| Example 48 | Example 6 | 5 | 77.88 | 1.27 | 63.42 | 1.40 | — |
| Example 49 | Example 7 | 5 | 78.15 | 1.29 | 63.65 | 1.36 | — |
| Example 50 | Example 8 | 5 | 77.43 | 1.30 | 63.20 | 1.37 | — |
| Example 51 | Example 9 | 5 | 77.59 | 1.34 | 63.45 | 1.33 | — |
| Example 52 | Example 10 | 5 | 34.20 | 7.20 | −17.52 | 1.30 | 0.268 |
| Example 53 | Example 11 | 5 | 34.06 | 9.25 | −19.20 | 1.56 | 0.168 |
| Example 54 | Example 12 | 4 | 59.13 | 45.40 | 11.30 | 1.36 | 0.093 |
| Example 55 | Example 13 | 4 | 54.87 | 41.42 | 13.25 | 1.27 | 0.111 |
| Example 56 | Example 14 | 5 | 80.03 | 1.61 | 69.08 | 1.91 | — |
| Example 57 | Example 15 | 5 | 77.86 | 1.26 | 70.21 | 1.95 | 0.212 |
| Example 58 | Example 16 | 5 | 37.21 | −2.11 | −12.23 | 1.75 | 0.159 |
| Example 59 | Example 17 | 5 | 42.89 | 21.18 | 26.44 | 1.90 | 0.083 |
| Example 60 | Example 18 | 5 | 35.12 | −5.89 | −21.20 | 1.84 | 0.163 |

TABLE 16

| Comparative Example and Reference Examples | Production of resin composition - Kind of organic and inorganic composite pigments | Dispersing condition (-) | Properties of resin composition - Hue L* value (-) | a* value (-) | b* value (-) | Light resistance (ΔE* value) (-) | Transparency (linear absorption) (μm⁻¹) |
|---|---|---|---|---|---|---|---|
| Comparative Example 4 | Comparative Example 1 | 1 | 76.43 | 1.01 | 60.57 | 4.03 | — |
| Reference Example 13 | Reference Example 1 | 5 | 37.11 | 6.16 | −18.11 | 3.28 | — |
| Reference Example 14 | Reference Example 2 | 5 | 60.30 | 47.38 | 12.58 | 3.35 | — |
| Reference Example 15 | Reference Example 3 | 5 | 77.58 | 1.11 | 63.00 | 3.61 | — |
| Reference Example 16 | Reference Example 4 | 5 | 77.32 | 1.23 | 63.75 | 3.22 | — |

What is claimed is:

1. An organic and inorganic composite pigment having an average particle diameter of 0.01 to 10.0 μm, comprising:
   a white inorganic particle;
   a coating formed on a surface of said white inorganic particle, comprising an organosilane compound or a polysiloxane;
   an organic pigment coat formed on said coating in an amount of 1 to 200 parts by weight based on 100 parts by weight of the white inorganic particle; and
   an ultraviolet light-absorbing agent existing in at least one portion selected from the group consisting of (1) a portion between the surface of said white inorganic particle and said coating comprising an organosilane compound or a polysiloxane, (2) an inside of said coating comprising an organosilane compound or a polysiloxane, (3) a portion between said coating comprising an organosilane compound or a polysiloxane and said organic pigment coat, (4) an inside of said organic pigment coat, and (5) a portion at a surface of said organic pigment coat.

2. An organic and inorganic composite pigment according to claim 1, further comprising a coating layer formed between the surface of the white inorganic particle and a coating comprising the ultraviolet light-absorbing agent or said coating comprising an organosilane compound or polysiloxane, said coating layer comprising at least one compound selected from the group consisting of hydroxides of aluminum, oxides of aluminum, hydroxides of silicon and oxides of silicon.

3. An organic and inorganic composite pigment according to claim 2, wherein the amount of the coating layer comprising at least one compound selected from the group consisting of hydroxides of aluminum, oxides of aluminum, hydroxides of silicon and oxides of silicon, is 0.01 to 20% by weight, calculated as Al, SiO2 or a sum of Al and SiO2, based on the weight of said white inorganic particle.

4. An organic and inorganic composite pigment according to claim 1, wherein the amount of the ultraviolet light-absorbing agent is 0.1 to 20% by weight based on the weight of the organic pigment coat.

5. An organic and inorganic composite pigment according to claim 1, wherein said organic and inorganic composite pigment has a BET specific surface area value of 1.0 to 100 m²/g and a light resistance (ΔE* value) of not more than 3.5.

6. A paint comprising:
   said organic and inorganic composite pigment defined in claim 1; and
   a paint base material.

7. A paint according to claim 6, wherein the amount of said organic and inorganic composite pigment is 0.5 to 100 parts by weight based on 100 parts by weight of said paint base material.

8. A rubber or resin composition comprising:

said organic and inorganic composite pigment defined in claim 1; and a rubber or resin composition base material.

9. A rubber or resin composition according to claim 8, wherein the amount of said organic and inorganic composite pigment is 0.01 to 200 parts by weight based on 100 parts by weight of said rubber or resin.

10. An organic and inorganic composite pigment having an average particle diameter of 0.01 to 10.0 μm, comprising:

a white inorganic particle;

a coating layer formed on a surface of said white inorganic particle, comprising at least one compound selected from the group consisting of hydroxides of aluminum, oxides of aluminum, hydroxides of silicon and oxides of silicon;

a coating formed on said coating layer, comprising an organosilane compound, or a polysiloxane;

an organic pigment coat formed on said coating in an amount of 1 to 200 parts by weight based on 100 parts by weight of the white inorganic particle; and an ultraviolet light-absorbing agent existing in at least one portion selected from the group consisting of (1) a portion between the surface of said white inorganic particle and said coating comprising an organosilane compound or a polysiloxane, (2) an inside of said coating comprising an organosilane compound or a polysiloxane, (3) a portion between said coating comprising an organosilane compound or a polysiloxane and said organic pigment coat, (4) an inside of said organic pigment coat and (5) a portion at a surface of said organic pigment coat.

11. An organic and inorganic composite pigment having an average particle diameter of 0.01 to 10.0 μm, a BET specific surface area value of 1.0 to 100 $m^2/g$ and a light resistance ($\Delta E^*$ value) of not more than 3.5, comprising:

a white inorganic particle;

a coating formed on a surface of said white inorganic particle, comprising an organosilane compound or a polysiloxane;

an organic pigment coat formed on said coating in an amount of 1 to 200 parts by weight based on 100 parts by weight of the white inorganic particle; and an ultraviolet light-absorbing agent existing in at least one portion selected from the group consisting of (1) a portion between the surface of said white inorganic particle and said coating comprising an organosilane compound or polysiloxane, (2) an inside of said coating comprising an organosilane compound or a polysiloxane, (3) a portion between said coating comprising an organosilane compound or a polysiloxane and said organic pigment coat, (4) an inside of said organic pigment coat, and (5) a portion at a surface of said organic pigment coat.

* * * * *